United States Patent
Babaei et al.

(10) Patent No.: US 11,316,619 B2
(45) Date of Patent: Apr. 26, 2022

(54) HARQ FEEDBACK TRANSMISSION

(71) Applicants: Alireza Babaei, Fairfax, VA (US);
Esmael Dinan, Herndon, VA (US);
Kyungmin Park, Herndon, VA (US);
Hyoungsuk Jeon, Centreville, VA (US);
Hua Zhou, Herndon, VA (US)

(72) Inventors: Alireza Babaei, Fairfax, VA (US);
Esmael Dinan, Herndon, VA (US);
Kyungmin Park, Herndon, VA (US);
Hyoungsuk Jeon, Centreville, VA (US);
Hua Zhou, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 44 days.

(21) Appl. No.: 16/122,212

(22) Filed: Sep. 5, 2018

(65) Prior Publication Data
US 2019/0074935 A1 Mar. 7, 2019

Related U.S. Application Data

(60) Provisional application No. 62/554,298, filed on Sep. 5, 2017, provisional application No. 62/554,296, filed on Sep. 5, 2017.

(51) Int. Cl.
*H04L 1/18* (2006.01)
*H04W 72/02* (2009.01)
*H04W 72/04* (2009.01)

(52) U.S. Cl.
CPC .......... *H04L 1/1812* (2013.01); *H04L 1/1854* (2013.01); *H04L 1/1861* (2013.01); *H04W 72/02* (2013.01); *H04W 72/0453* (2013.01)

(58) Field of Classification Search
None
See application file for complete search history.

(56) References Cited

U.S. PATENT DOCUMENTS

| 2017/0201968 | A1* | 7/2017 | Nam ................ H04W 72/042 |
| 2018/0019843 | A1* | 1/2018 | Papasakellariou ... H04B 7/0413 |
| 2018/0183551 | A1* | 6/2018 | Chou ................. H04W 72/042 |

(Continued)

OTHER PUBLICATIONS

3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures; (Release 14).

(Continued)

*Primary Examiner* — Jeffrey M Rutkowski
*Assistant Examiner* — Basil Ma
(74) *Attorney, Agent, or Firm* — Jacob L. Mangan; Kavon Nasabzadeh; Philip R. Smith

(57) ABSTRACT

A wireless device may receive one or more messages. The one or more messages may comprise configuration parameters of a first uplink control channel and a second uplink control channel. Downlink control information may be received. The downlink control information may indicate a downlink transmission of a transport block via a downlink channel. One of the first uplink control channel or the second uplink control channel may be selected as a selected uplink control channel based on one or more parameters of the downlink control information. A hybrid automatic repeat request (HARD) feedback for the transport block may be transmitted via the selected uplink control channel.

17 Claims, 21 Drawing Sheets

(56) References Cited

U.S. PATENT DOCUMENTS

| | | | |
|---|---|---|---|
| 2018/0199334 A1* | 7/2018 | Ying | H04W 48/12 |
| 2018/0310257 A1* | 10/2018 | Papasakellariou | H04W 72/1289 |
| 2019/0223201 A1* | 7/2019 | Lee | H04L 5/0048 |

OTHER PUBLICATIONS

3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).

3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 14).

3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).

3GPP TS 36.331 V14.3.0 (Jun. 2017); Technical Specification; 3rd Generation Partnership Project;Technical Specification Group Radio Access Network; Evolved Universal Terrestrial Radio Access (E-UTRA); Radio Resource Control (RRC); Protocol specification; (Release 14).

3GPP TS 38.211 V0.2.0 (Aug. 2017); Technical Specification; 3rd Generation Partnership Project; Technical Specification Group Radio Access Network; NR; Physical channels and modulation; (Release 15).

3GPP TS 38.212 V0.1.0 (Aug. 2017); Technical Specification; 3rd Generation Partnership Project; Technical Specification Group Radio Access Network; NR; Multiplexing and channel coding; (Release 15).

3GPP TS 38.214 V0.1.0 (Aug. 2017); Technical Specification; 3rd Generation Partnership Project; Technical Specification Group Radio Access Network; NR; Physical layer procedures for data; (Release 15).

3GPP TS 38.321 V1.0.0 (Sep. 2017); Technical Specification; 3rd Generation Partnership Project; Technical Specification Group Radio Access Network; NR; Medium Access Control (MAC) protocol specification; (Release 15).

3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation; (Release 14).

R1-1710120; 3GPP TSG RAN WG1 NR Ad-Hoc#2; Qingdao, P.R. China Jun. 27-30, 2017; Source: ZTE Title: Analysis of URLLC reliability for uplink control channel; Agenda item: 5.1.3.2.6; Document for: Discussion and Decision.

R1-1710322; 3GPP TSG RAN WG1 NR Ad-Hoc#2; Qingdao, P.R. China Jun. 27-30, 2017; Agenda Item: 5.1.3.2.6; Source: LG Electronics; Title: Discussion on UL control with ultra-reliability; Document for: Discussion and decision.

R1-1710560; 3GPP TSG RAN WG1 NR Ad-Hoc#2; Qingdao, P.R. China Jun. 27-30, 2017; Source: Intel Corporation; Title: On UL control channel design aspects for URLLC; Agenda item: 5.1.3.2.6; Document for: Discussion and Decision.

R1-1710597; 3GPP TSG RAN WG1 NR Ad-Hoc#2; Qingdao, P.R. China Jun. 27-30, 2017; Agenda Item: 5.1.3.2.6; Source: Lenovo, Motorola Mobility; Title: Enhanced SR carried in UL control channel; Document for: Discussion and decision.

R1-1710712; 3GPP TSG RAN WG1 NR Ad-Hoc#2; Qingdao, P.R. China Jun. 27-30, 2017; Agenda Item: 5.1.3.2.6; Source: Samsung; Title: PUCCH Design for URLLC; Document for: Discussion and decision.

R1-1710875; 3GPP TSG-RAN WG1 NR Ad-Hoc#2; Qingdao, P.R. China, Jun. 27-20, 2017; Agenda Item: 5.1.3.2.6; Source: InterDigital Inc.; Title: Considerations for ultra-reliable UCI transmission; Document for: Discussion, Decision.

R1-1710901; 3GPP TSG RAN WG1 NR Ad-Hoc #2; Qingdao, P.R. China, Jun. 27-30, 2017; Agenda item: 5.1.3.2.6; Source: Nokia, Alcatel-Lucent Shanghai Bell; Title: On URLLC UCI transmission; Document for: Discussion and Decision.

R1-1710942; 3GPP TSG RAN WG1 NR Ad-Hoc#2; Qingdao, P.R. China, Jun. 27-30, 2017; Source: Panasonic Title: Discussion on SR for URLLC and multiplexing with HARQ-ACK; Agenda Item: 5.1.3.2.6; Document for Discussion.

R1-1711106; 3GPP TSG RAN WG1 NR Ad-Hoc#2; Qingdao, P.R. China Jun. 27-30, 2017; Source: NTT Docomo, Inc.; Title: UL control channel design for URLLC; Agenda Item: 5.1.3.2.6; Document for: Discussion and Decision.

R1-1711497; 3GPP TSG RAN WG1 NR Ad-Hoc#2; Qingdao, P.R. China Jun. 27-30, 2017; Agenda Item: 5.1.3.2.6; Source: Ericsson; Title: On PUCCH for Ultra-Reliable Transmission; Document for: Discussion, Decision.

R1-1711498; 3GPP TSG RAN WG1 NR Ad-Hoc#2; Qingdao, P.R. China Jun. 27-30, 2017; Agenda Item: 5.1.3.2.6; Source: Ericsson; Title: On the Performance Evaluation of PUCCH for Ultra-Reliable Transmission; Document for: Discussion, Decision.

R1-1711548; 3GPP TSG RAN WG1 NR Ad-Hoc#2; Qingdao, P.R. China Jun. 27-30, 2017; Agenda Item: 5.1.3.2.6; Source: Sequans; Title: Resource allocation for PUCCH to support URLLC; Document for: Discussion and decision.

R1-1711553; 3GPP TSG-RAN WG1 NR Ad-hoc #2;Jun. 27-30, 2017; Qingdao, P. R. China; Agenda item: 5.1.3.2.6; Source: Qualcomm Incorporated; Title: The necessity of reliable SR design for GF/GB UL URLLC transmission; Document for: Discussion/Decision.

R1-1712211; 3GPP TSG RAN WG1 Meeting #90; Prague, Czech Republic, Aug. 21-25, 2017; Agenda Item: 6.1.3.2.6; Source: Huawei, HiSilicon; Title: Discussion on UCI feedback for URLLC; Document for: Discussion and decision.

R1-1712409; 3GPP TSG RAN WG1 Meeting #90; Prague, Czechia, Aug. 21-25, 2017; Agenda item: 6.1.3.2.6 Source: CATT; Title: PUCCH aspects for ultra-reliable communications; Document for: Discussion and Decision.

R1-1712457; 3GPP TSG RAN WG1 Meeting #90; Prague, Czechia, Aug. 21-25, 2017; Source: ZTE Title: Analysis of URLLC reliability for uplink control channel; Agenda item: 6.1.3.2.6; Document for: Discussion and Decision.

R1-1712586; 3GPP TSG RAN WG1 Meeting#90; Prague, Czech Republic, Aug. 21-25, 2017; Source: Intel Corporation; Title: On UL control channel design aspects for URLLC; Agenda item: 6.1.3.2.6; Document for: Discussion and Decision.

R1-1713184; 3GPP TSG RAN WG1 RAN1 #90; Prague, Czech Republic Aug. 21-25, 2017; Agenda Item: 6.1.3.2.6; Source: LG Electronics; Title: Discussion on UL control with ultra-reliability; Document for: Discussion and decision.

R1-1713301; 3GPP TSG RAN WG1 Meeting #90; Prague, P.R. Czechia Aug. 21-25, 2017; Agenda Item: 6.1.3.2.6; Source: Sequans; Title: Resource allocation for PUCCH to support URLLC; Document for: Discussion and decision.

R1-1713439; 3GPP TSG-RAN WG1 #90; Aug. 21-25, 2017; Prague, Czech; Agenda item: 6.1.3.2.6; Source: Qualcomm Incorporated; Title: SR design for GF/GB UL URLLC transmission; Document for: Discussion/Decision.

R1-1713634; 3GPP TSG RAN WG1 Meeting #90; Prague, Czechia Aug. 21-25, 2017; Agenda Item: 6.1.3.2.6 Source: Samsung; Title: PUCCH Design for URLLC; Document for: Discussion and decision.

R1-1713715; 3GPP TSG RAN WG1 Meeting #90; Prague, P.R. Czechia Aug. 21-25, 2017; Agenda Item: 6.1.3.2.6; Source: MediaTek Inc.; Title: ACK/NACK feedback design and reliability for URLLC; Document for: Discussion and Decision.

R1-1713947; 3GPP TSG RAN WG1 Meeting #90; Prague, Czechia, Aug. 21-25, 2017; Source: NTT Docomo Inc.; Title: UL control channel design for URLLC; Agenda Item: 6.1.3.2.6; Document for: Discussion and Decision.

(56) References Cited

OTHER PUBLICATIONS

R1-1714082; 3GPP TSG RAN WG1 #90; Prague, Czech Republic, Aug. 21-25, 2017; Agenda item: 6.1.3.2.6 Source: Nokia, Nokia Shanghai Bell; Title: On URLLC UCI transmission; Document for: Discussion and Decision.

R1-1714114; 3GPP TSG-RAN WG1 Meeting #90; Prague, Czech Republic, Aug. 21-25, 2017; Agenda Item: 6.1.3.2.6; Source: InterDigital, Inc.; Title: Considerations for ultra-reliable UCI transmission; Document for: Discussion, Decision.

R1-1714429; 3GPP TSG RAN WG1 Meeting#90; Prague, Czech Republic, Aug. 21-25, 2017; Agenda Item: 6.1.3.2.6; Source: Ericsson; Title: On PUCCH for Ultra-Reliable Transmission; Document for: Discussion, Decision.

R1-1714430; 3GPP TSG RAN WG1 Meeting#90; Prague, Czech Republic, Aug. 21-25, 2017; Agenda Item: 6.1.3.2.6; Source: Ericsson; Title: On the Performance Evaluation of PUCCH for Ultra-Reliable Transmission; Document for: Discussion, Decision.

3GPP TS 38.213 V0.1.1 (Sep. 2017); Technical Specification; 3rd Generation Partnership Project; Technical Specification Group Radio Access Network; NR; Physical layer procedures for control; (Release 15).

3GPP TS 38.300 V0.6.0 (Aug. 2017); Technical Specification; 3rd Generation Partnership Project; Technical Specification Group Radio Access Network; NR; NR and NG-RAN Overall Description; Stage 2; (Release 15).

3GPP TS 38.331 V0.0.5 (Aug. 2017); Technical Specification; 3rd Generation Partnership Project; Technical Specification Group Radio Access Network; NR; Radio Resource Control (RRC); Protocol specification; (Release 15 ).

* cited by examiner

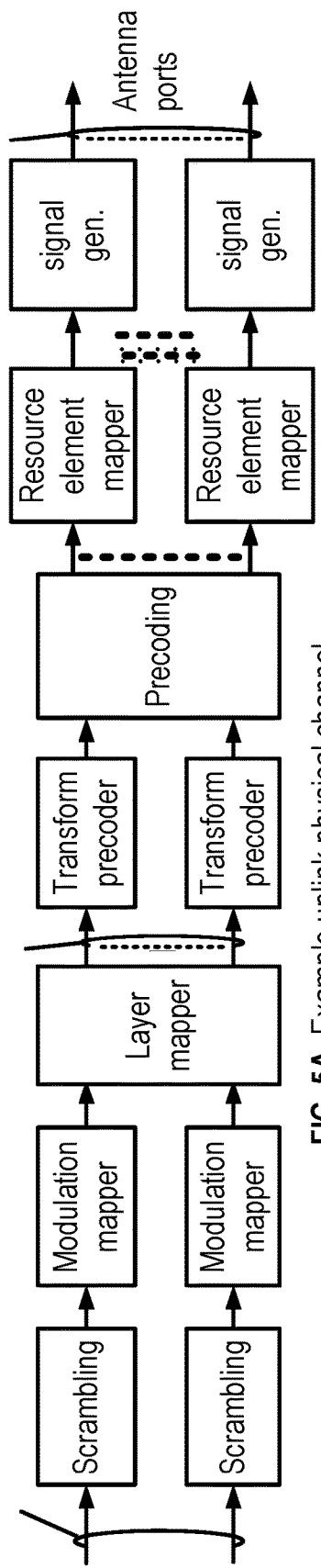
FIG. 5A Example uplink physical channel
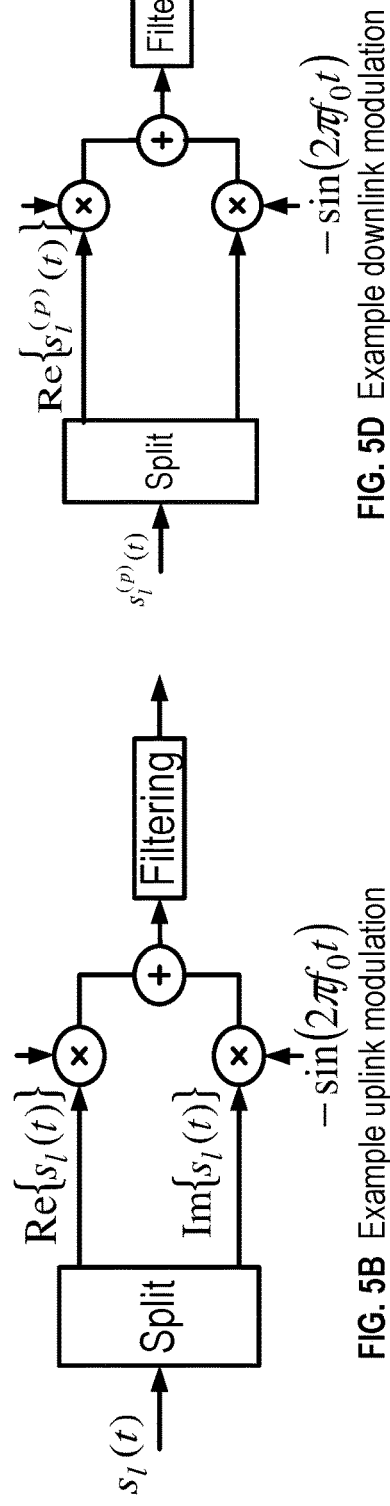
FIG. 5B Example uplink modulation
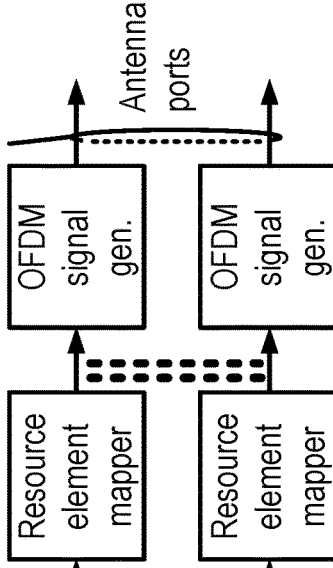
FIG. 5D Example downlink modulation
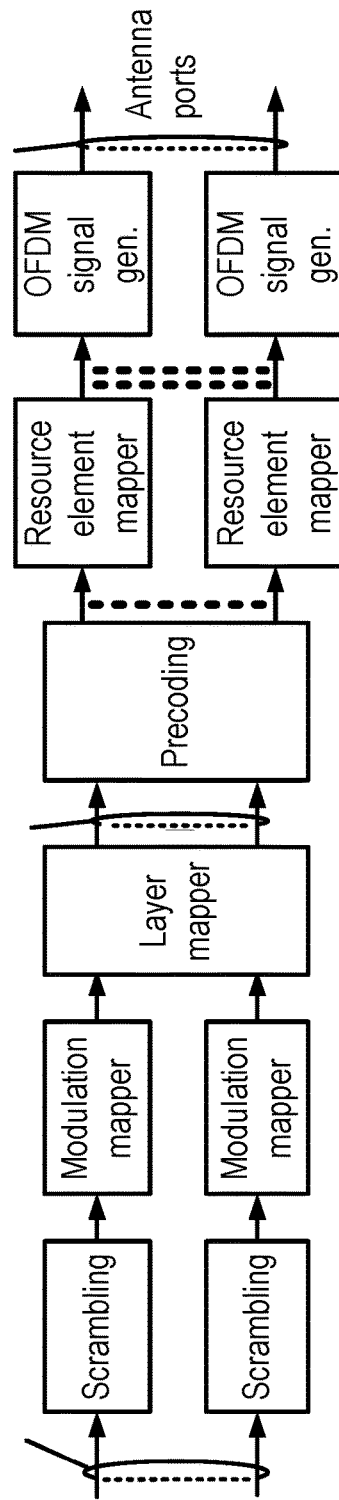
FIG. 5C Example downlink physical channel Dual-Connectivity- two MAC entities at UE side Example 1: 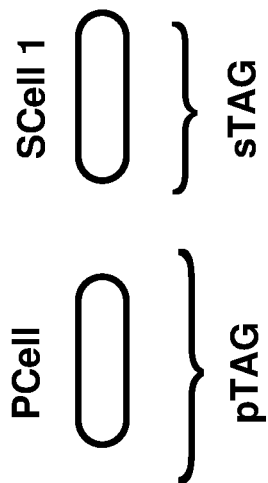
Example 2: 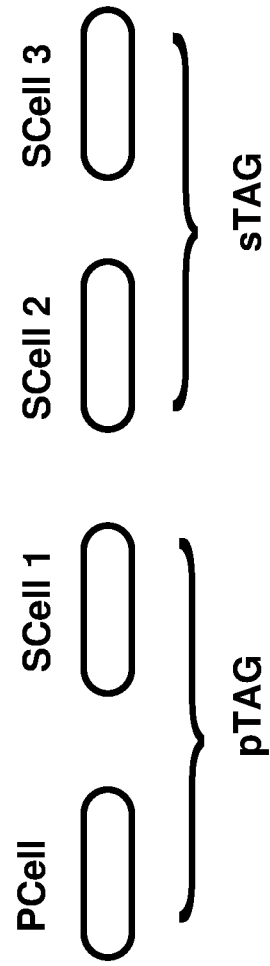
Example 3: 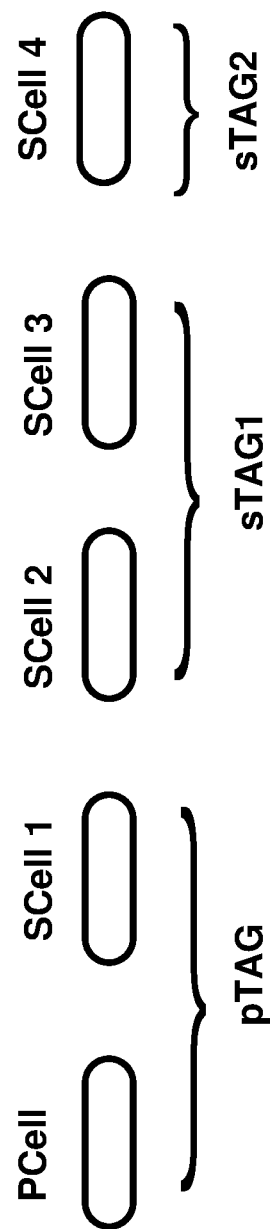
FIG. 8

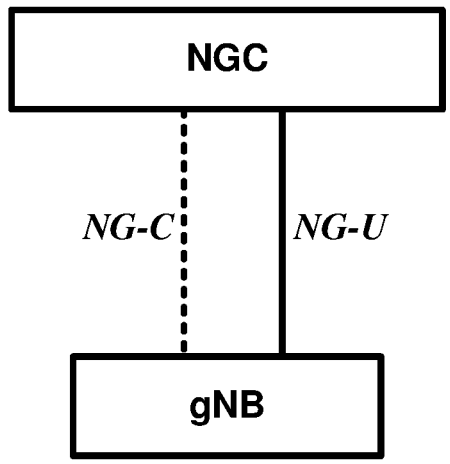
FIG. 10A  gNB connected to NGC
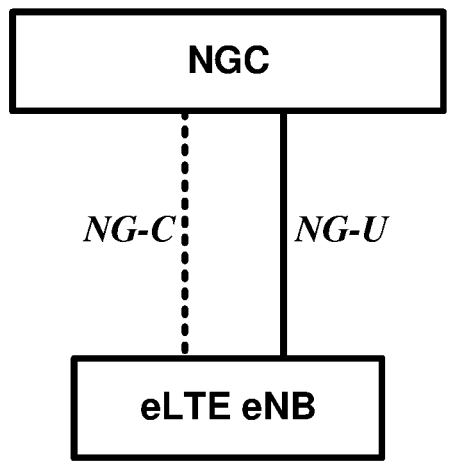
FIG. 10B  eLTE eNB connected to NGC

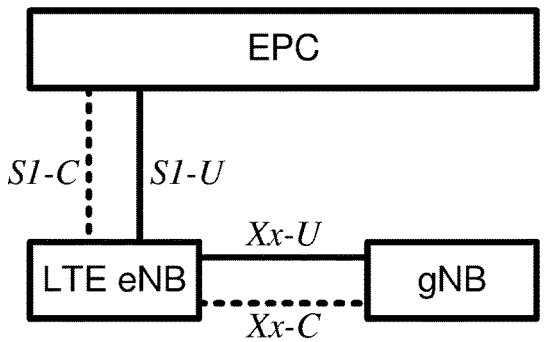

FIG. 11A LTE eNB connected to EPC with non-standalone gNB. gNB user plane connected to EPC via LTE eNB.

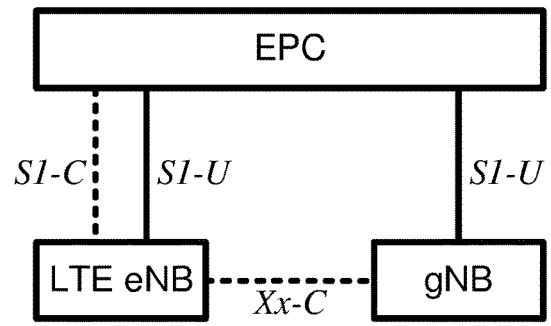

FIG. 11B LTE eNB connected to EPC with non-standalone gNB. gNB user plane connected to EPC directly.

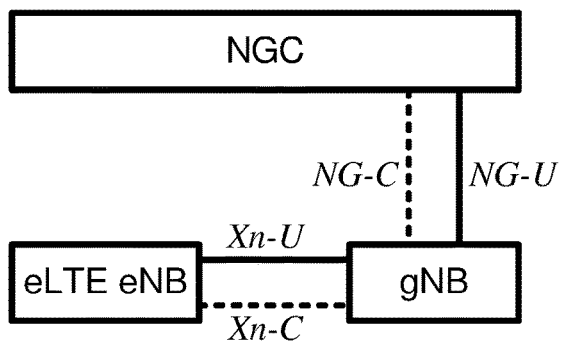

FIG. 11C gNB connected to NGC with non-standalone eLTE eNB. eLTE eNB user plane connected to NGC via gNB.

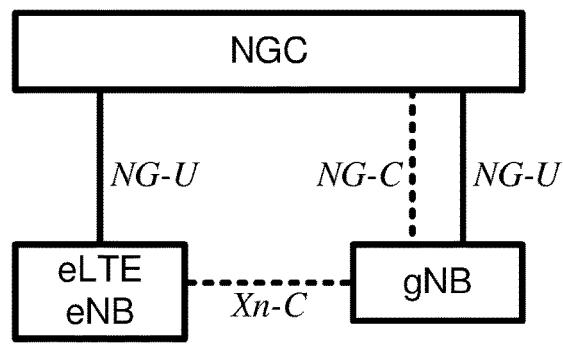

FIG. 11D gNB connected to NGC with non-standalone eLTE eNB. eLTE eNB user plane connected to NGC directly.

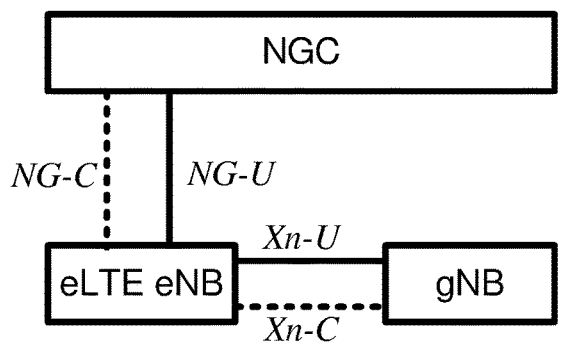

FIG. 11E eLTE eNB connected to NGC with non-standalone gNB. gNB user plane connected to NGC via eLTE eNB.

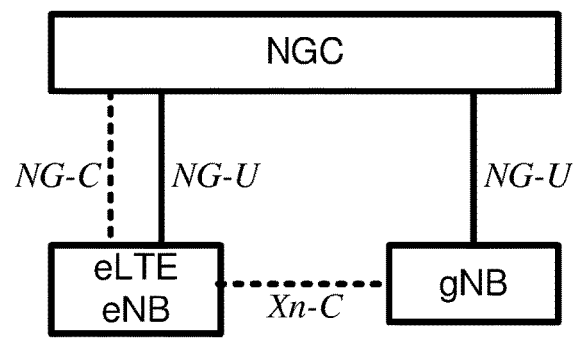

FIG. 11F eLTE eNB connected to NGC with non-standalone gNB. gNB user plane connected to NGC directly.

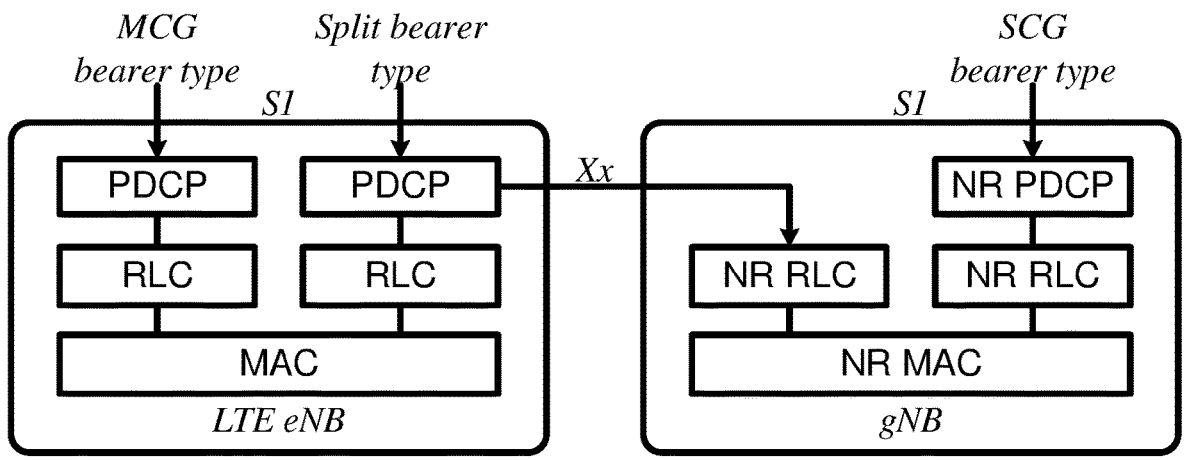
FIG. 12A Radio protocol architecture for split bearer and SCG bearer. LTE eNB connected to EPC with non-standalone gNB.
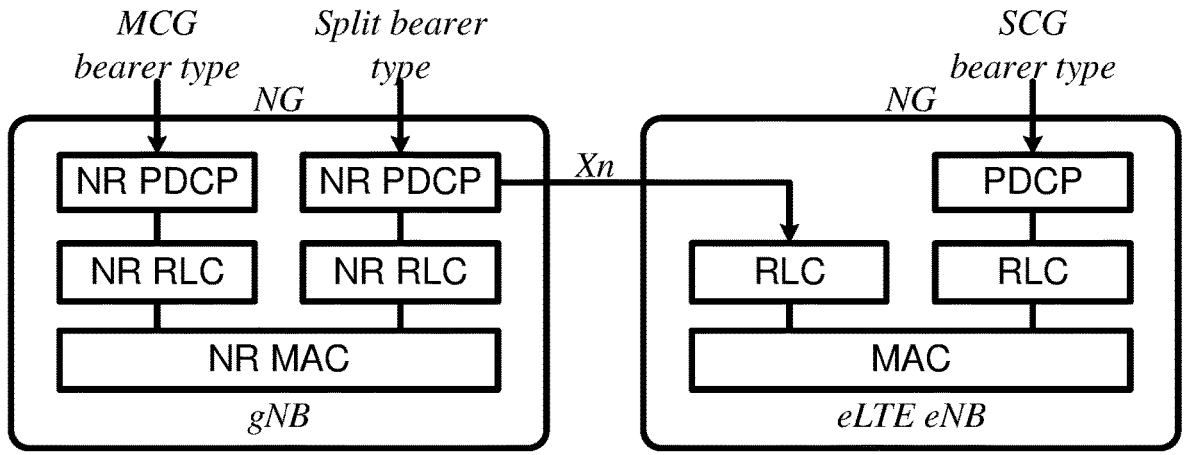
FIG. 12B Radio protocol architecture for split bearer and SCG bearer. gNB connected to NGC with non-standalone eLTE eNB.
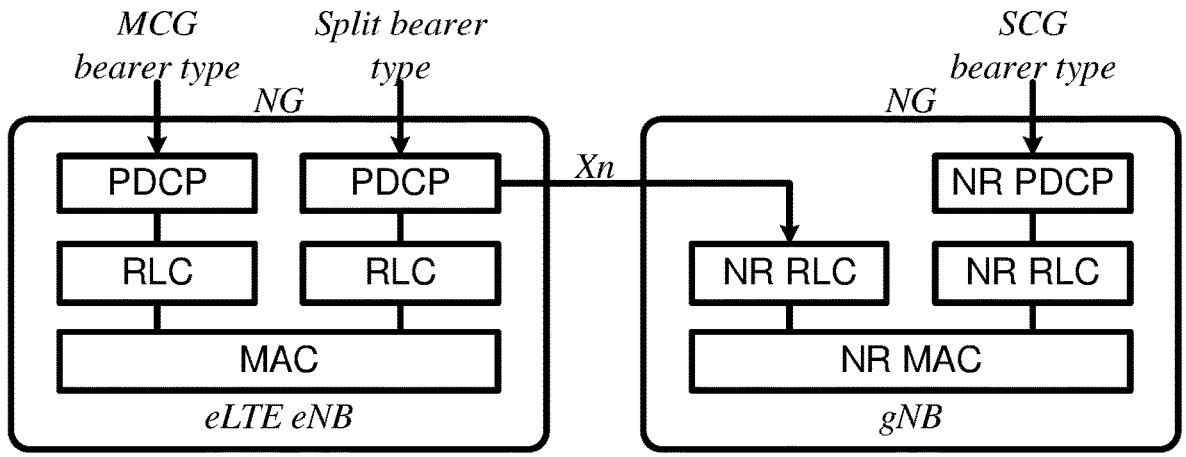
FIG. 12C Radio protocol architecture for split bearer and SCG bearer. eLTE eNB connected to NGC with non-standalone gNB.

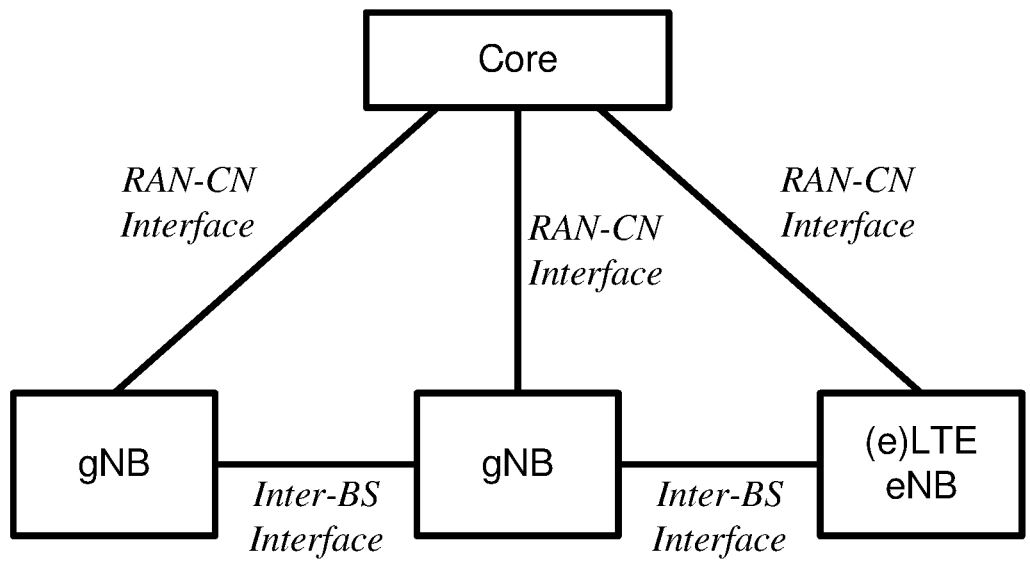
FIG. 13A Non-centralized deployment
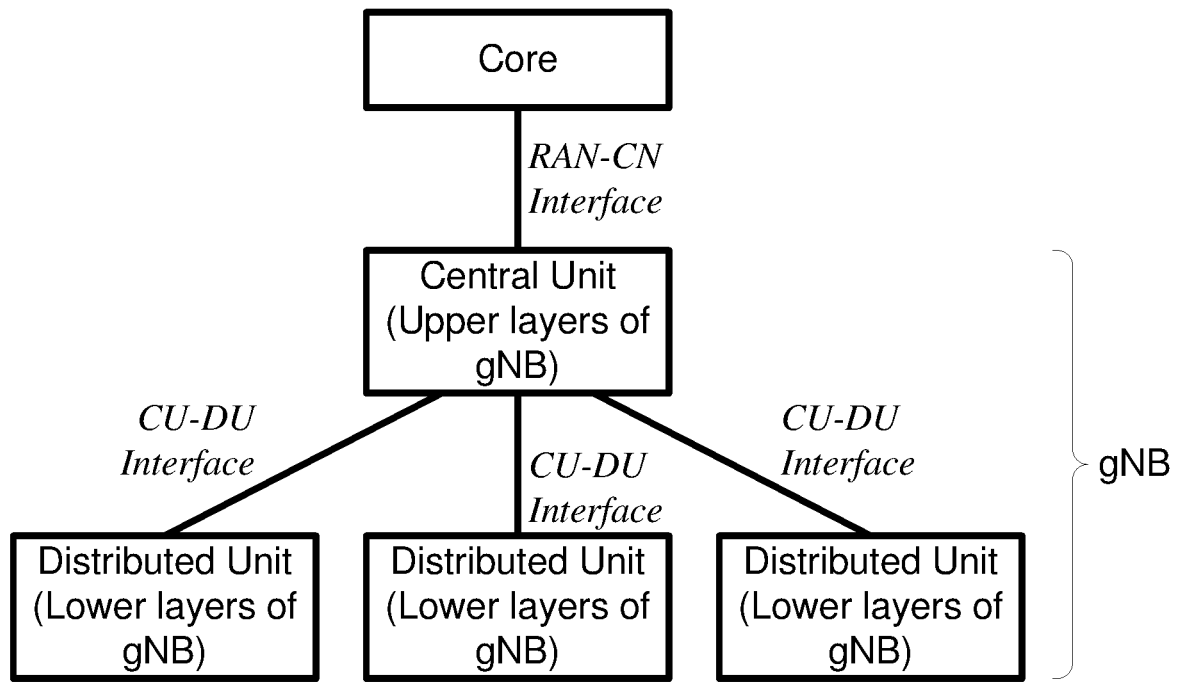
FIG. 13B Centralized deployment

HARQ FEEDBACK TRANSMISSION

This application claims the benefit of U.S. Provisional Application No. 62/554,296, filed Sep. 5, 2017, and U.S. Provisional Application No. 62/554,298, filed Sep. 5, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

DETAILED DESCRIPTION OF EMBODIMENTS

Figure 1:
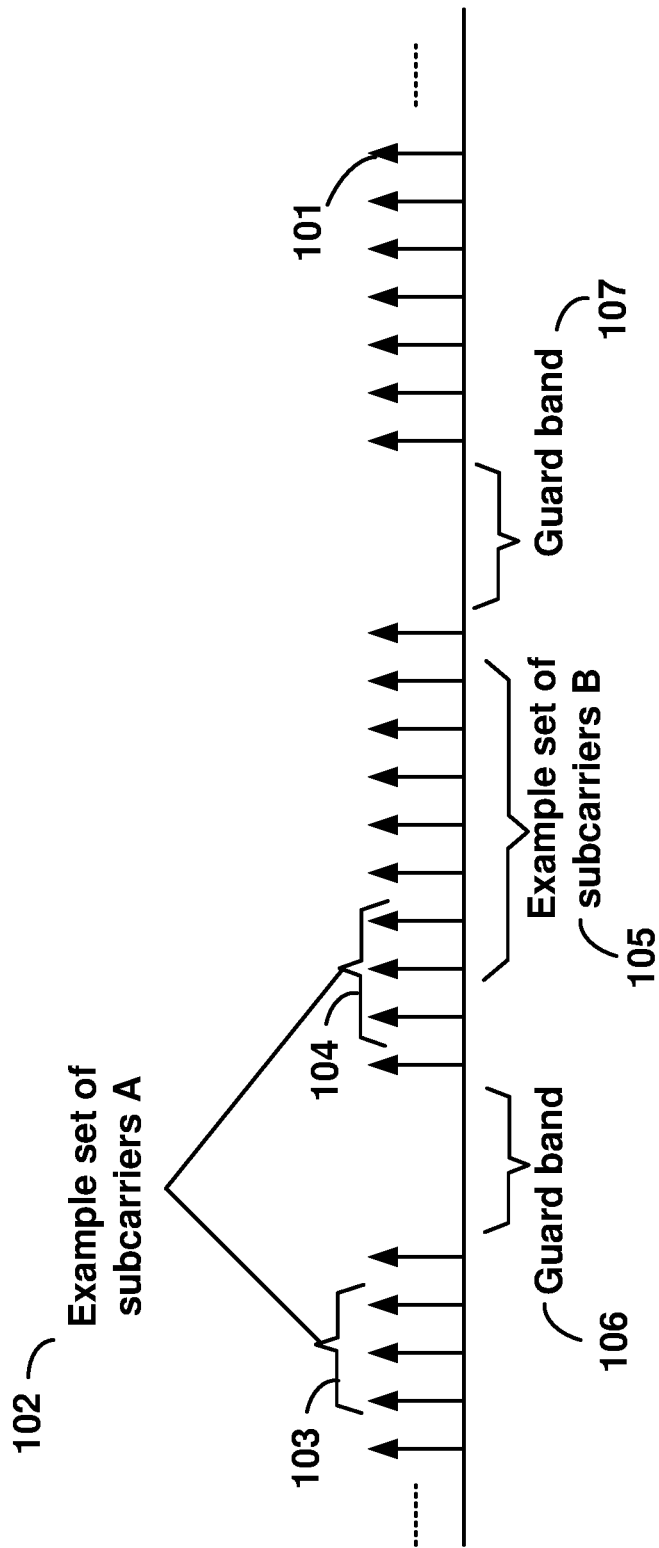
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to HARQ feedback transmission and timing in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
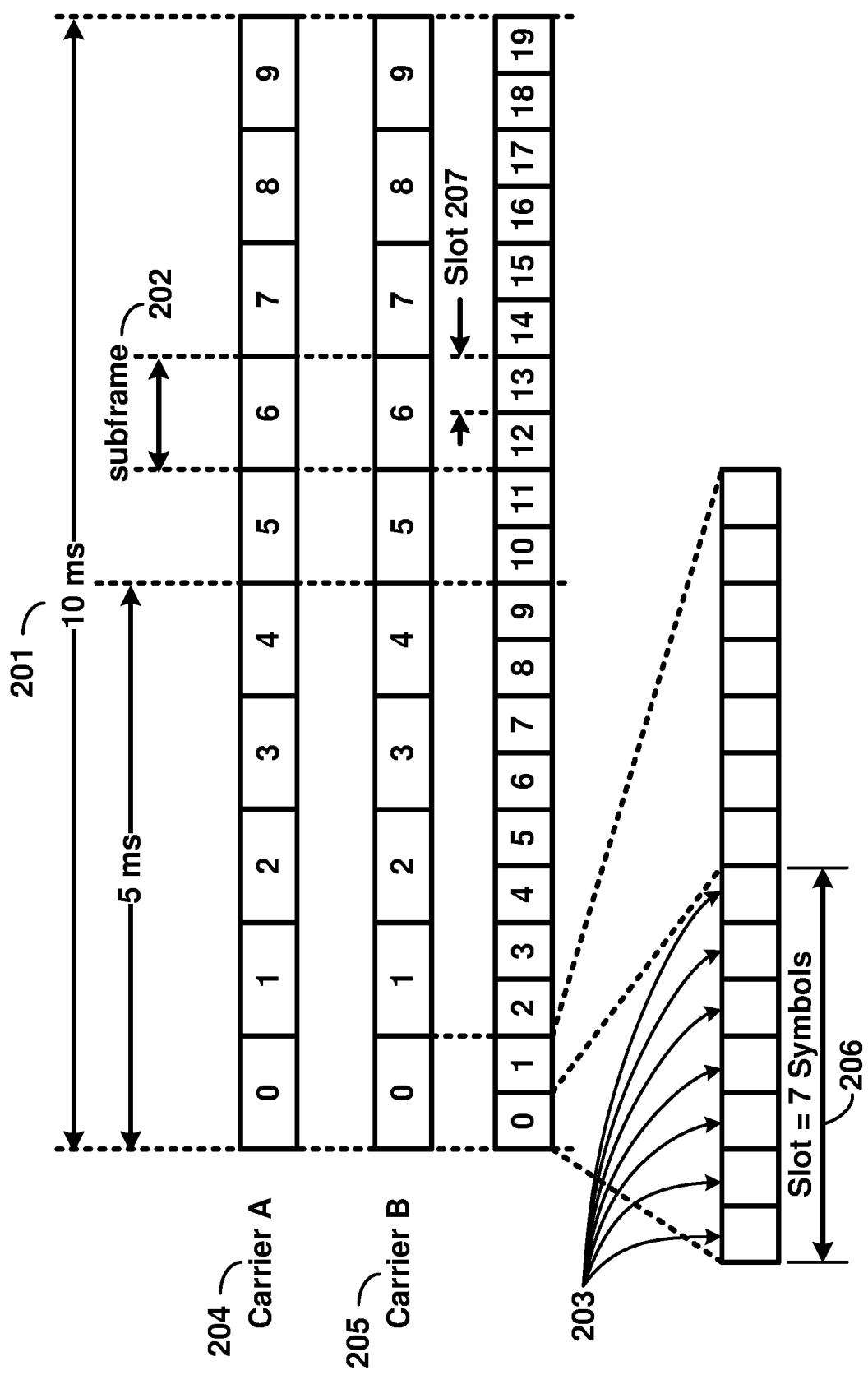
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
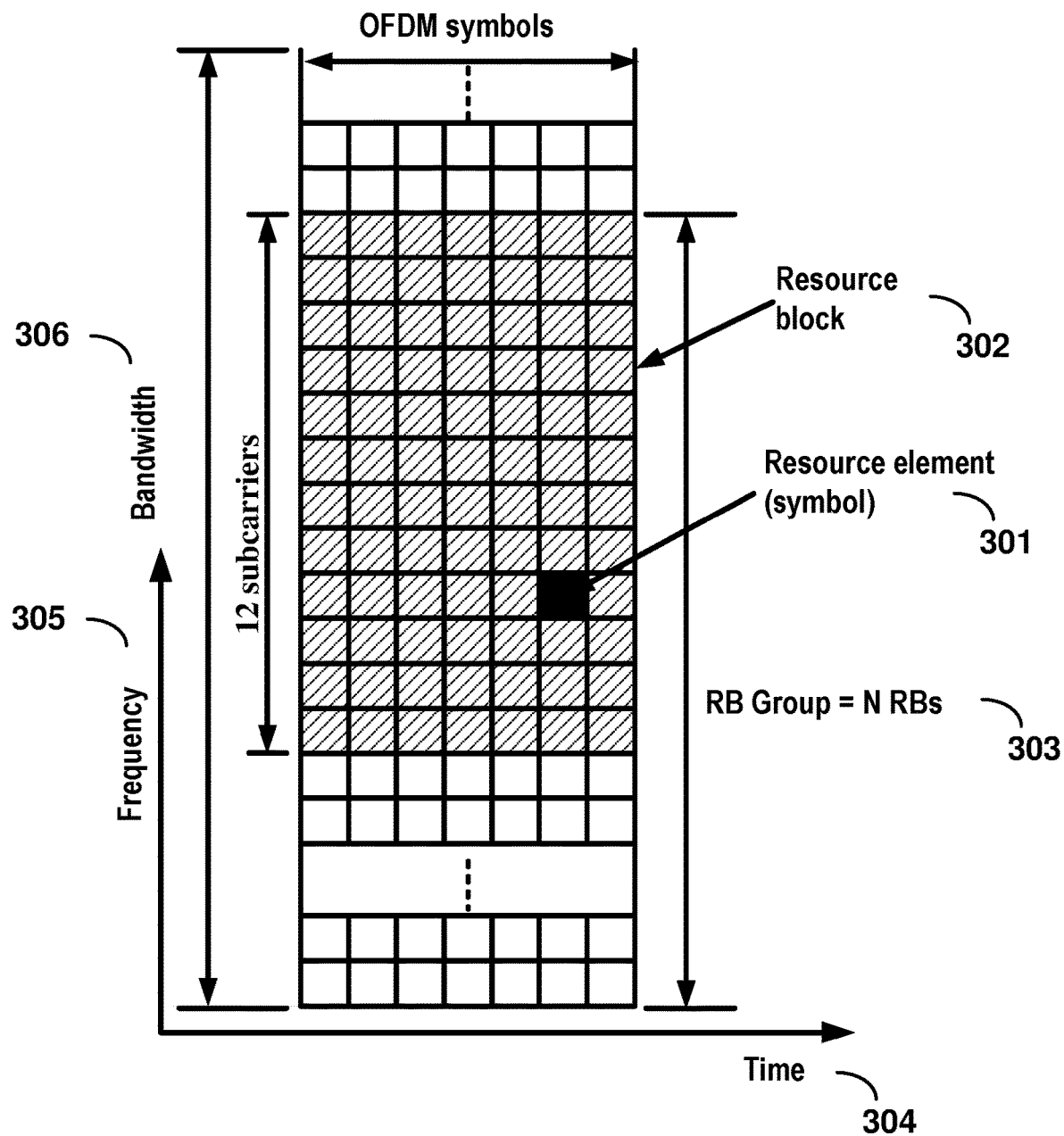
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
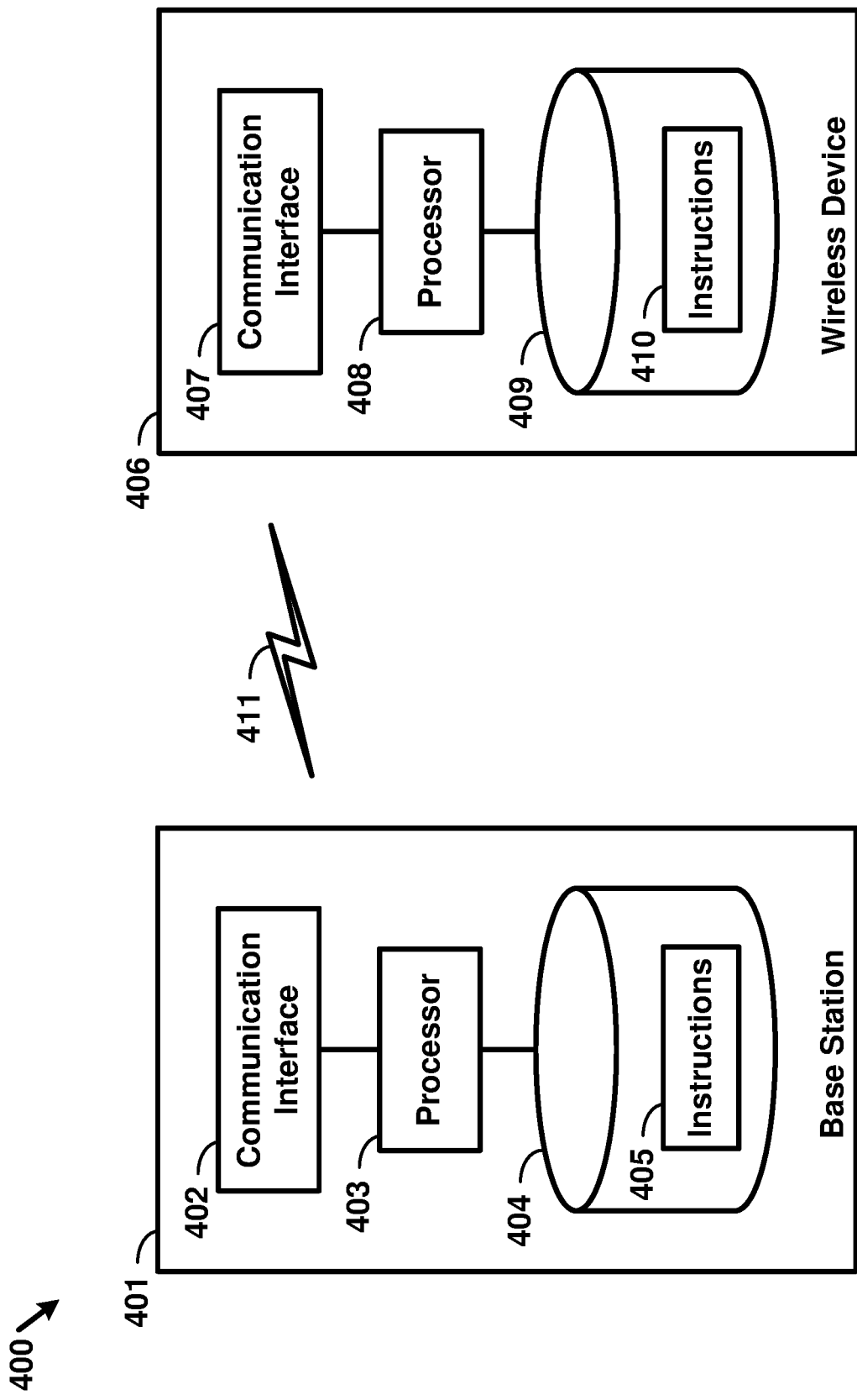
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
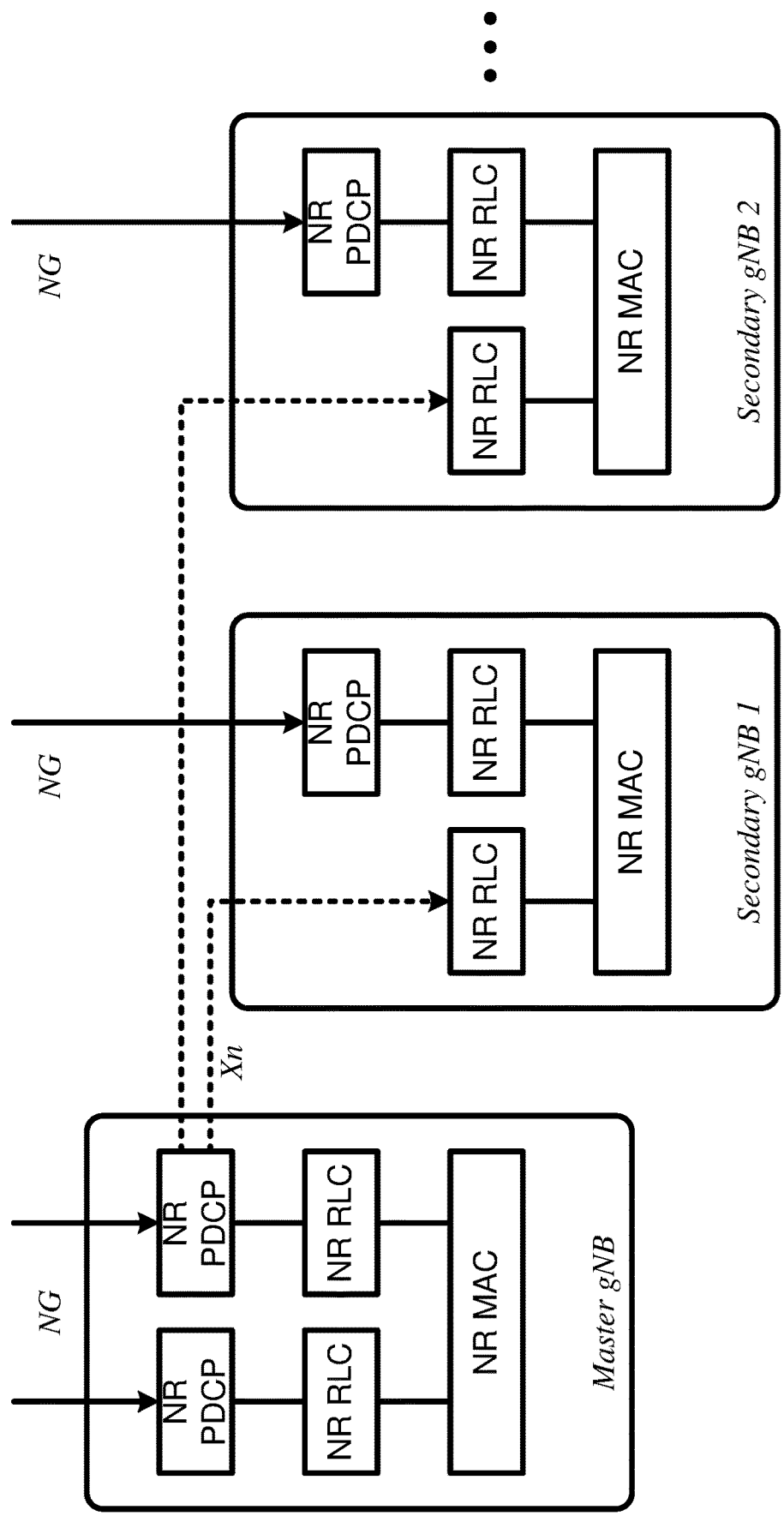
FIG. 6 is an example diagram for a protocol structure with multi-connectivity as per an aspect of an embodiment of the present invention.
Figure 7:
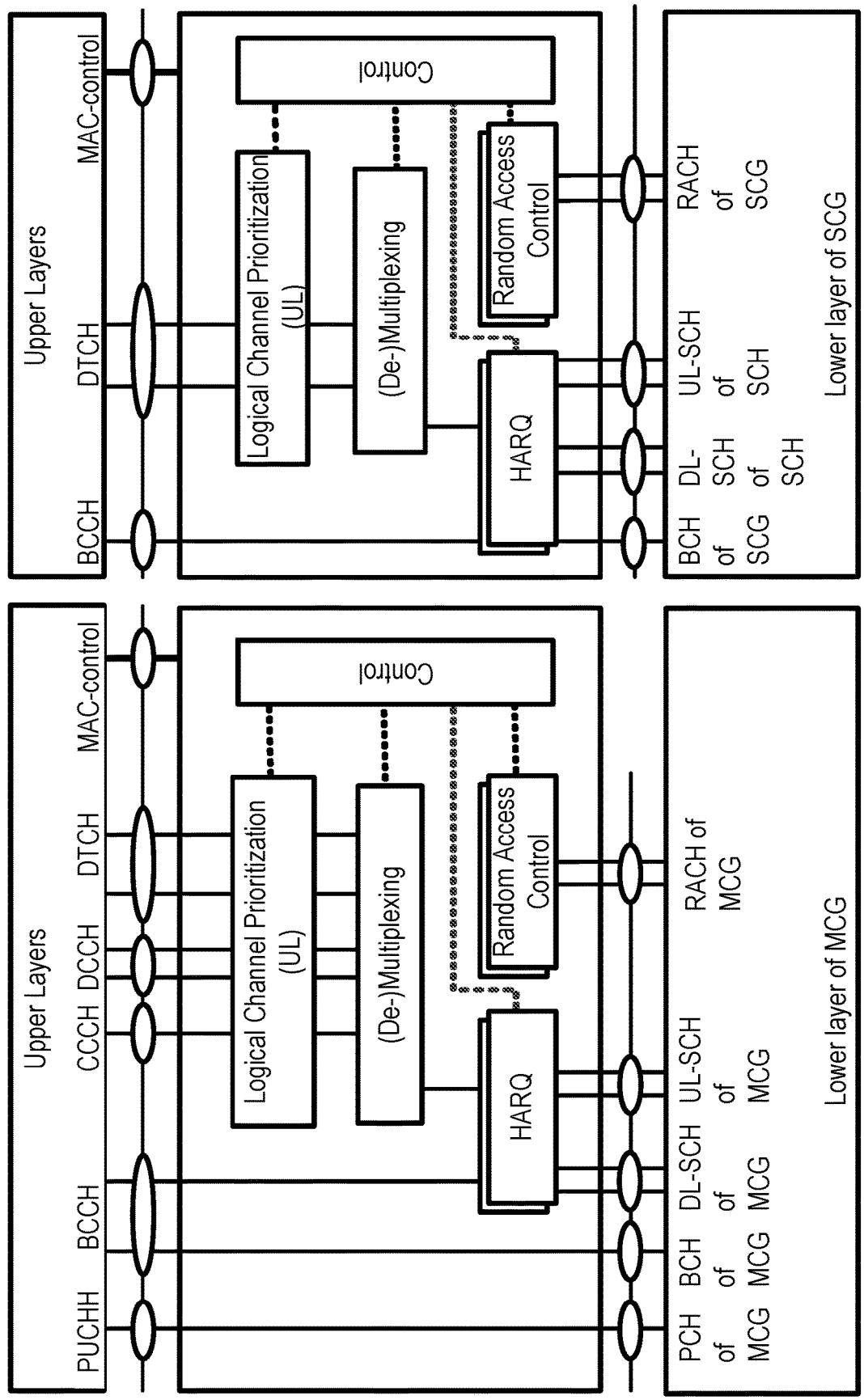
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
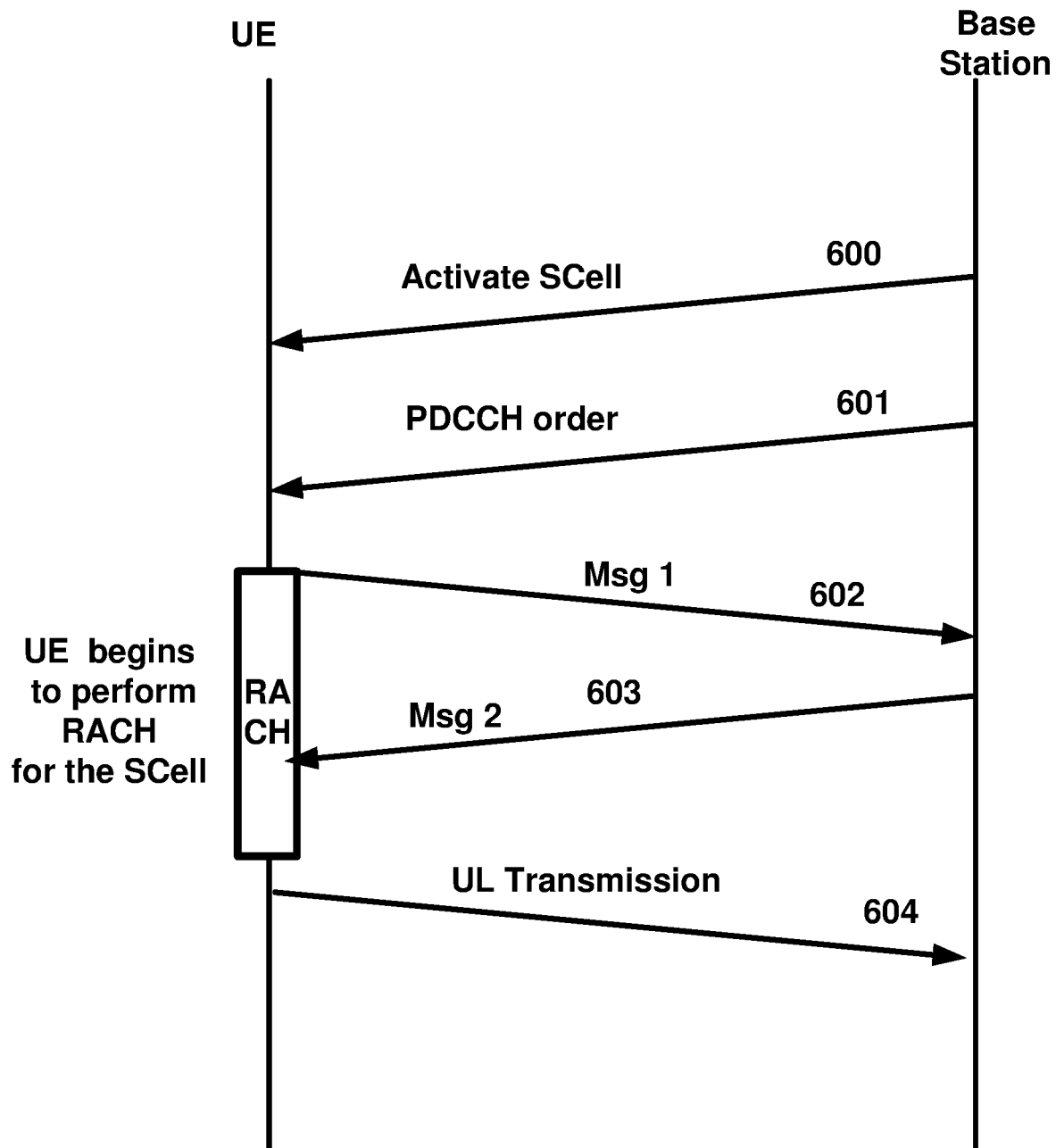
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding(configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S 1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station.

Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
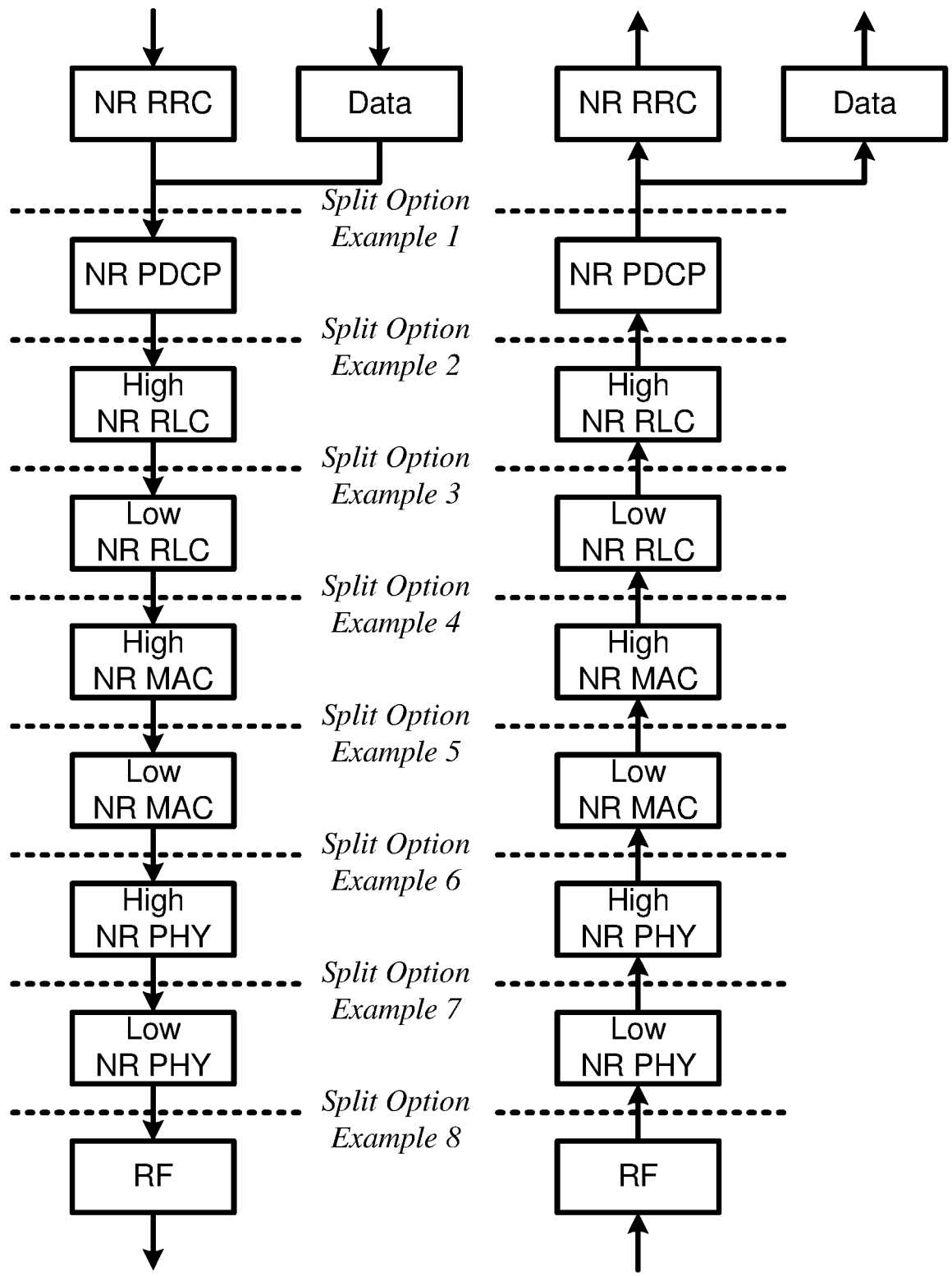
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s)

or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities.

Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or more messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by two or more MAC entities. In an example, a logical channel may be scheduled by one of a plurality of MAC entities. In an example, the one or more bearers may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra-reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, $0 \leq n \leq N$ (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerologies and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter laa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example embodiment, a HARQ feedback timing may be indicated in a DCI scheduling a downlink transmission (e.g., a PDSCH). In an example, DCI may comprise a field with a value/number/integer that indicates the time between the downlink transmission and HARQ feedback corresponding to the downlink transmission (e.g., ACK or NACK). The HARQ feedback may be transmitted on a PUCCH and/or PUSCH. In an example, HARQ feedback corresponding to a plurality of transport blocks may be transmitted on a PUSCH and/or PUCCH. In an example, the plurality of transport blocks may be associated with a same numerology/TTI. In an example, at least one of the plurality of transport blocks may be associated with a numerology/TTI different from numerologies/TTIs of the other transport blocks in the plurality of transport blocks.

In an example embodiment, a wireless device may monitor a plurality of PDCCH candidates in a common search space (e.g., in a primary cell) and UE-specific search space (e.g., in secondary cell). In an example, the wireless device may receive a PDCCH/EPDCCH on a first cell scheduling the wireless device (e.g., for PUSCH and/or PDSCH transmission) on the first cell (e.g., self-carrier scheduling). In an example, the PDCCH/EPDCCH received on the first cell may schedule the wireless device on a second cell (e.g., cross-carrier scheduling). In an example, for the cross-carrier scheduling, PDCCH and a scheduled PDSCH may same and/or different numerologies. In an example, for self-carrier scheduling, a PDCCH and the scheduled PDSCH may have a same or different numerology. In an example, for self- and/or cross-carrier scheduling, PDCCH and the scheduled PUSCH may have a same or different numerology.

In an example embodiment, when numerology between PDCCH and the scheduled transmission is different, the time granularity indicated in the DCI for the timing relationship between the end of the PDCCH and the corresponding scheduled transmission may be based on the numerology of the scheduled transmission.

In an example embodiment, HARQ feedback of a plurality of downlink component carriers with a same or different numerology may be transmitted together. In an example embodiment, a time granularity of HARQ feedback transmission indicated in a DCI scheduling a PDSCH may be based on a numerology of a PUCCH transmission. In an example, the PUCCH may correspond to the PDSCH (e.g., based on the numerology of PDSCH and/or content of TB(s) in PDSCH and/or service type of TB(s) and/or size of TB(s) in PDSCH etc.).

In an example, long duration NR-PUCCH for up to 2 bits in a given slot may comprise HARQ ACK feedback, two-states SR e.g., based on on-off keying, time domain OCC. In an example, HARQ ACK feedback may be transmitted by BPSK or QPSK modulation and may be repeated in time domain and multiplied with sequence(s).

In an example, NR may support one long PUCCH format for UCI with up to 2 bits with high multiplexing capacity. In an example, NR may support one long PUCCH format for UCI with large payload with no multiplexing capacity. In an example, NR may support one long PUCCH format for UCI with moderate payload with some multiplexing capacity.

In an example, at least a first PUCCH with a short duration and/or a second PUCCH with a long duration may be configured for a wireless device. The first PUCCH and the second PUCCH may be transmitted on different numerologies/TTIs. In an example, the short PUCCH may employ a numerology with a shorter TTI than the long PUCCH. In an example, there may be a mapping between a type of uplink control information (UCI) and the type of PUCCH (e.g., short PUCCH or long PUCCH) that carriers the UCI. In an example, periodic CSI may be reported at least on short PUCCH or long PUCCH. In an example, the periodic CSI may be reported in a single slot. In an example, the periodic CSI may be reported us single slot and/or multiple slots. In an example, type I CSI feedback may be reported for P/SP/A-CSI. In an example, type I CSI feedback may be carrier on either PUCCH or PUSCH. In an example, type I CSI feedback may be carrier on either one of PUSCH or long PUCCH. In an example, type II CSI feedback may be carrier at least on PUSCH.

In an example, for a long PUCCH with up to 2 bits UCI, DMRS may occur in every symbol in long PUCCH. In an example, for a long PUCCH with up to 2 bits UCI, DMRS may occur in even and/or odd symbols in long PUCCH. In an example, for a PUCCH format for UCI with large payload and/or with no multiplexing capacity within a slot: the DMRS and UCI may be mapped to different symbols. In an example, for intra-slot frequency-hopping, one or two DMRS symbol(s) may be mapped on each frequency-hop of the long-PUCCH. In an example, there may be one DMRS per frequency-hop. The location may be around the middle of the frequency-hop. In an example, there may be one or two DMRS per frequency-hop.

In an example, a logical channel prioritization procedure in a MAC layer of a wireless device may take into account a plurality of information/parameters indicated by an uplink grant DCI for its multiplexing functionalities and creating transport blocks. In an example, at least part of the information/parameters indicated by the DCI/profile may be visible to the MAC layer and/or logical channel prioritization procedure. The plurality of information may be indicated to the wireless device explicitly or implicitly. In an example, RRC may configure the wireless device with a plurality of profiles and the uplink grant DCI may indicate an index to a profile in the plurality of profiles. In an example, the uplink grant DCI may comprise a field indicating the index. The profile may comprise a plurality of parameters comprising a numerology (e.g., numerology to be employed for transmission of PUSCH) and/or TTI (e.g., TTI to be employed for transmission of PUSCH) and/or a QoS profile for example indicating a service type associated with the grant/PUSCH and/or logical channels associated with the grant/PUSCH and/or power-related parameters (e.g., power headroom reporting, etc.) and/or one or more restrictions that the wireless device may consider when multiplexing data (e.g., MAC SDUs and/or MAC CEs) in at least one TB associated with the grant/PUSCH.

In an example, a DCI scheduling a transmission in downlink, uplink, etc., may indicate numerology/TTI corresponding to the scheduled transmission. In an example, a DCI indicating a downlink assignment may indicate a cell/numerology/TTI corresponding to the scheduled downlink assignment. In an example, the numerology/TTI may be implicitly indicated. For example, the wireless device may implicitly determine a numerology/TTI corresponding to a scheduled transmission from the numerology/TTI on which the DCI is received. In an example, the numerology/TTI may be implicitly indicated by the DCI by indicating a profile/index. The wireless device may be configured with a plurality of profiles and the index indicated by the DCI may determine the profile. In an example, the profile may comprise a plurality of parameters comprising the numerology/TTI. In an example, the DCI may comprise a field, the value of the field indicating the profile (e.g., using an index). In an example, the numerology/TTI of the scheduled transmission may be explicitly indicated, e.g., in the scheduling DCI. In an example, the scheduling DCI may comprise a field indicating the numerology/TTI of the scheduled transmission.

In an example, the DCI scheduling a transmission may indicate a timing between the DCI and the scheduled transmission (e.g., timing between DCI and PUSCH or timing between DCI and PDSCH, etc.). In an example, the timing may be explicitly indicated in the DCI. In an example, the timing may be indicated as a number (e.g., integer). In an example, the scheduling DCI may comprise a field, the value of the field may indicate the timing. In an example, the timing may be implicitly indicated to the wireless device by the DCI. In an example, the base station may configure the wireless device with a plurality of timing values and the DCI may indicate one of the plurality of the configured timing values. In an example, the wireless device may use the value of timing indicated in the DCI along with a timing granularity to determine the time between the DCI and the scheduled transmission. The timing granularity may be based on a rule. In an example, the timing granularity between a DCI and a scheduled PUSCH may be based on a numerology of the PUSCH (e.g., in terms of OFSM symbols, TTI, slot, etc.). In an example, the timing granularity between DCI and the PDSCH may be based on the numerology of the PDSCH. In an example, in case of self-carrier scheduling PDSCH, the PDCCH and the PDSCH may have a same numerology. The wireless device may implicitly determine that the time granularity between DCI and the PDSCH is based on the numerology of the PDCCH/DCI.

In an example embodiment, the wireless device may transmit HARQ feedback associated with a PDSCH on a PUCCH and/or multiplex the HARQ feedback associate with a PDSCH on a PUSCH. The timing between the PDSCH and the HARQ feedback may be indicated in the DCI. In an example, the timing may be explicitly indicated to the wireless device. In an example, the timing may be implicitly indicated to the wireless device. The base station may configure (e.g., with RRC) a plurality of timing values and the DCI may indicate a timing value among the plurality of timing values. In an example, the DCI may comprise a field indicating the timing between scheduled PDSCH and the HARQ feedback associated with the scheduled PDSCH. In an example, a DCI format may not comprise a HARQ feedback timing field. The wireless device may not transmit HARQ feedback for scheduled downlink transmission associated with the DCI. The wireless device may determine the time between PDSCH and HARQ feedback based on the timing indicated by the DCI and a timing granularity. In an example, the wireless device may determine the timing granularity between PDSCH and HARQ feedback based on numerology of a PUCCH associated with the PDSCH.

In an example, a wireless device may be configured with a plurality of cell groups. In an example, a cell group in the plurality of cell groups may be associated with one or more PUCCHs, e.g., one or more carriers transmitting PUCCH. In an example, the one or more PUCCHs within a cell group may have a same numerology/TTI. In an example, at least two of the one or more PUCCHs within a cell group may have different numerologies/TTIs. In an example, a PDSCH and/or TTI/numerology associated with a PDSCH transmitted on a cell in a cell group may be associated with a PUCCH in the cell group e.g., based on the numerology/TTI associated with the PDSCH, the TB(s) content/size/service type associated with the PDSCH, etc. The wireless device may determine timing between the PDSCH and HARQ feedback for the PDSCH based on a numerology corresponding to the PUCCH associated with PDSCH.

In an example embodiment with slot-based scheduling, for HARQ-ACK with more than a first number of bits (e.g., 2 bits), PUSCH may be rate-matched. In an example, for HARQ-ACK with up to the first number of bits (e.g., 2 bits), PUSCH may be punctured. In an example, with frequency first mapping, UCI resource mapping principles (e.g., around RS) may be common for PUSCH with DFT-s-OFDM waveform and CP-OFDM waveform. In an example, at least for periodic CSI report configured by RRC and aperiodic CSI report triggered by UL grant, the UL data may be rate-matched around the UCI.

In an example, a wireless device may receive an IE (e.g., PUCCH-Config) comprising physical uplink control channel (PUCCH) configuration parameters. In an example, the wireless device may receive a first IE (e.g., PUCCH-ConfigCommon) for common PUCCH configuration parameters and/or a second IE (e.g., PUCCH-ConfigDedicated) for UE-specific PUCCH configuration. Example embodiments enhance the PUCCH configuration procedures and/or PUCCH configuration parameters. An example PUCCH-Config 1E is shown below.

```
PUCCH-ConfigCommon ::=                    SEQUENCE {
    deltaPUCCH-Shift                          ENUMERATED {ds1, ds2, ds3},
    nRB-CQI                                   INTEGER (0 . . . 98),
    nCS-AN                                    INTEGER (0 . . .7),
    n1PUCCH-AN                                INTEGER (0 . . . 2047)
}
PUCCH-ConfigCommon-v1310 ::=              SEQUENCE {
    n1PUCCH-AN-InfoList-r13                   N1PUCCH-AN-InfoList-r13
        OPTIONAL, -- Need OR
    pucch-NumRepetitionCE-Msg4-Level0-r13 ENUMERATED {n1, n2, n4, n8}
        OPTIONAL, -- Need OR
    pucch-NumRepetitionCE-Msg4-Level1-r13 ENUMERATED {n1, n2, n4, n8}
        OPTIONAL, -- Need OR
    pucch-NumRepetitionCE-Msg4-Level2-r13 ENUMERATED {n4, n8, n16, n32}
        OPTIONAL, -- Need OR
    pucch-NumRepetitionCE-Msg4-Level3-r13 ENUMERATED {n4, n8, n16, n32}
        OPTIONAL -- Need OR
}
PUCCH-ConfigCommon-v14xy ::=              SEQUENCE {
    pucch-NumRepetitionCE-Msg4-Level3-r14 ENUMERATED {n64, n128}
        OPTIONAL -- Need OR
}
PUCCH-ConfigDedicated ::=                 SEQUENCE {
    ackNackRepetition                         CHOICE{
        release                                   NULL,
        setup                                     SEQUENCE {
            repetitionFactor                          ENUMERATED {n2,
n4, n6, spare1},
            n1PUCCH-AN-Rep                            INTEGER
(0 . . . 2047)
        }
    },
    tdd-AckNackFeedbackMode                   ENUMERATED {bundling,
multiplexing}   OPTIONAL -- Cond TDD
}
PUCCH-ConfigDedicated-v1020 ::=           SEQUENCE {pucch-Format-r10
        CHOICE {
    format3-r10                                   SEQUENCE {
        n3PUCCH-AN-List-r10                       SEQUENCE (SIZE (1 . . . 4)) OF INTEGER
(0 . . . 549)   OPTIONAL, -- Need ON
        twoAntennaPortActivatedPUCCH-Format3-r10      CHOICE {
            release
            NULL,
            setup
            SEQUENCE {
                n3PUCCH-AN-ListP1-r10                 SEQUENCE (SIZE (1 . . . 4))
OF INTEGER (0 . . . 549)
            }
        }
                                                  OPTIONAL -- Need ON
    },
    channelSelection-r10                          SEQUENCE {
        n1PUCCH-AN-CS-r10                             CHOICE {
            release                                       NULL,
            setup
            SEQUENCE {
                n1PUCCH-AN-CS-List-r10
```

```
                        SEQUENCE (SIZE (1 . . . 2)) OF N1PUCCH-AN-CS-r10
                    }
                }
                                        OPTIONAL -- Need ON
        }
    }
                                        OPTIONAL, -- Need OR
    twoAntennaPortActivatedPUCCH-Format1a1b-     ENUMERATED {true}
r10
        OPTIONAL, -- Need OR
    simultaneousPUCCH-PUSCH-r10
        ENUMERATED {true}       OPTIONAL, -- Need OR
    n1PUCCH-AN-RepP1-r10                INTEGER
(0 . . . 2047)     OPTIONAL -- Need OR
}
PUCCH-ConfigDedicated-v1130 ::=         SEQUENCE {
    n1PUCCH-AN-CS-v1130                 CHOICE {
        release                             NULL,
        setup                               SEQUENCE {
            n1PUCCH-AN-CS-ListP1-r11        SEQUENCE (SIZE
(2 . . . 4)) OF INTEGER (0 . . . 2047)
        }
    }
                                        OPTIONAL, -- Need ON
    nPUCCH-Param-r11                    CHOICE {
        release                             NULL,
        setup                               SEQUENCE {
            nPUCCH-Identity-r11             INTEGER (0 . . . 503),
            n1PUCCH-AN-r11                  INTEGER
(0 . . . 2047)
        }
    }
                                        OPTIONAL -- Need ON
}
PUCCH-ConfigDedicated-v1250 ::=         SEQUENCE {
    nkaPUCCH-Param-r12                  CHOICE {
        release                             NULL,
        setup                               SEQUENCE {
            nkaPUCCH-AN-r12                 INTEGER
(0 . . . 2047)
        }
    }
}
PUCCH-ConfigDedicated-r13 ::=   SEQUENCE {
--Release 8
    ackNackRepetition-r13               CHOICE{
        release                             NULL,
        setup                               SEQUENCE {
            repetitionFactor-r13            ENUMERATED {n2, n4, n6,
spare1},
            n1PUCCH-AN-Rep-r13              INTEGER (0 . . . 2047)
        }
    },
    tdd-AckNackFeedbackMode-r13         ENUMERATED {bundling,
multiplexing}    OPTIONAL, -- Cond TDD
--Release 10
    pucch-Format-r13                    CHOICE {
        format3-r13                         SEQUENCE {
            n3PUCCH-AN-List-r13             SEQUENCE (SIZE (1 . . . 4)) OF INTEGER
(0 . . . 549)    OPTIONAL, -- Need ON
            twoAntennaPortActivatedPUCCH-Format3-r13         CHOICE {
                release
                    NULL,
                setup
                    SEQUENCE {
                        n3PUCCH-AN-ListP1-r13           SEQUENCE (SIZE (1 . . . 4))
OF INTEGER (0 . . . 549)
                    }
                }
                                        OPTIONAL -- Need ON
        },
        channelSelection-r13                SEQUENCE {
            n1PUCCH-AN-CS-r13               CHOICE {
                release                         NULL,
                setup
        SEQUENCE {
            n1PUCCH-AN-CS-List-r13
        SEQUENCE (SIZE (1 . . . 2)) OF N1PUCCH-AN-CS-r10,
            n1PUCCH-AN-CS-ListP1-r13
```

```
          SEQUENCE (SIZE (2 ... 4)) OF INTEGER (0 ... 2047)
          }
        }
                                         OPTIONAL -- Need ON
      },
      format4-r13                        SEQUENCE {
        format4-resourceConfiguration-r13    SEQUENCE (SIZE
(4)) OF Format4-resource-r13,
        format4-MultiCSI-resourceConfiguration-r13    SEQUENCE (SIZE
(1 ... 2)) OF Format4-resource-r13 OPTIONAL -- Need OR
      },
      format5-r13                        SEQUENCE {
        format5-resourceConfiguration-r13    SEQUENCE (SIZE
(4)) OF Format5-resource-r13,
        format5-MultiCSI-resourceConfiguration-r13    Format5-resource-r13
OPTIONAL    -- Need OR
      }
    }
                                         OPTIONAL, -- Need OR
    twoAntennaPortActivatedPUCCH-Format1a1b-    ENUMERATED {true}
r13
       OPTIONAL, -- Need OR
    simultaneousPUCCH-PUSCH-r13
       ENUMERATED {true}        OPTIONAL, -- Need OR
    n1PUCCH-AN-RepP1-r13                 INTEGER
(0 ... 2047)      OPTIONAL, -- Need OR
--Release 11
    nPUCCH-Param-r13                     CHOICE {
      release                            NULL,
      setup                              SEQUENCE {
        nPUCCH-Identity-r13              INTEGER (0 ... 503),
        n1PUCCH-AN-r13                   INTEGER
(0 ... 2047)
      }
    }
                                         OPTIONAL, -- Need ON
--Release 12
    nkaPUCCH-Param-r13                   CHOICE {
      release                            NULL,
      setup                              SEQUENCE {
        nkaPUCCH-AN-r13                  INTEGER
(0 ... 2047)
      }
    }
                                         OPTIONAL, -- Need ON
--Release 13
    spatialBundlingPUCCH-r13             BOOLEAN,
    spatialBundlingPUSCH-r13             BOOLEAN,
    harq-TimingTDD-r13                    BOOLEAN,
    codebooksizeDetermination-r13        ENUMERATED {dai,cc}
       OPTIONAL, -- Need OR
    maximumPayloadCoderate-r13           INTEGER (0 ... 7)
       OPTIONAL, -- Need OR
    pucch-NumRepetitionCE-r13            CHOICE {
      release                            NULL,
      setup                              CHOICE {
        modeA                              SEQUENCE {
          pucch-NumRepetitionCE-format1-r13
        ENUMERATED {r1, r2, r4, r8},
          pucch-NumRepetitionCE-format2-r13
        ENUMERATED {r1, r2, r4, r8}
        },
        modeB                            SEQUENCE {
          pucch-NumRepetitionCE-format1-r13
        ENUMERATED {r4, r8, r16, r32},
          pucch-NumRepetitionCE-format2-r13
        ENUMERATED {r4, r8, r16, r32}
        }
      }
    }
                                         OPTIONAL --Need ON
}
PUCCH-ConfigDedicated-v14xy ::=          SEQUENCE {
    pucch-NumRepetitionCE-format1-r14      ENUMERATED {r64,r128}
       OPTIONAL -- Need OR
}
Format4-resource-r13    ::=              SEQUENCE {
    startingPRB-format4-r13                  INTEGER (0 ... 109),
    numberOfPRB-format4-r13                  INTEGER (0 ... 7)
```

-continued

```
}
Format5-resource-r13    ::=          SEQUENCE {
   startingPRB-format5-r13              INTEGER (0 . . . 109),
   cdm-index-format5-r13                INTEGER (0 . . . 1)
}
N1PUCCH-AN-CS-r10    ::= SEQUENCE (SIZE (1 . . . 4)) OF INTEGER (0 . . . 2047)
N1PUCCH-AN-InfoList-r13 ::= SEQUENCE (SIZE(1 . . . maxCE-Level-r13)) OF INTEGER
(0 . . . 2047)
```

In an example, ackNackRepitition may indicate whether ACK/NACK repetition is configured. Cdm-index-format5 may be used for determining PUCCH resources of PUCCH format 5. In an example, codebooksizeDetermination may indicate whether HARQ codebook size is determined with a downlink assignment based solution or number of configured CCs. In an example, deltaPUCCH-Shift may be a parameter $\Delta_{shift}^{PUCCH}$ used for calculation of an orthogonal sequence index for PUCCH. In an example ds1 may correspond to value 1, ds2 may correspond to value 2, etc. In an example, harq-TimingTDD may indicate for a TDD SCell when aggregated with a TDD PCell of different UL/DL configurations whether deriving the HARQ timing for such a cell is done in the same way as the DL HARQ timing of an FDD SCell with a TDD PCell. In an example, maximumPayloadCoderate may indicate maximum payload or code rate for multi P-CSI on each PUCCH resource. In an example, n1PUCCH-AN may be a parameter $N_{PUCCH}^{(1)}$ used to calculate PUCCH resources. In an example, n1PUCCH-AN-r11 may indicate UE-specific PUCCH-AN resource offset. In an example, n1PUCCH-AN-CS-List may be a parameter $n_{PUCCH,j}^{(1)}$ for antenna port $p_0$ for PUCCH format 1b with channel selection and may be used for calculation of PUCCH resource. In an example, n1PUCCH-AN-CS-ListP1 may be a parameter $n_{PUCCH,j}^{(1,\tilde{p}1)}$ for used for calculation of PUCCH resources. Network may configure this field when pucch-Format is set to channelSelection. In an example, n1PUCCH-AN-Rep and n1PUCCH-AN-Rep1 may indicate a parameter $n_{PUCCH,ANRep}^{(1,p)}$ for antenna port P0 and for antenna port P1 respectively. In an example, n3PUCCH-AN-List and n3PUCCH-AN-ListP1 may indicate a parameter $n_{PUCCH}^{(3,p)}$ for antenna port P0 and for antenna port P1 respectively. In an example, nCS-An may indicate a parameter $N_{cs}^{(1)}$. In an example, nkaPUCCH-AN may indicate a parameter $N_{PUCCH}^{K_A}$. nkaPUCCH-AN may indicate PUCCH format 1a/1b starting offset for the subframe set $K^A$ Network may configure nkaPUCCH-AN in response to eimta-MainConfig being configured. In an example, nPUCCH-Identity may indicate a parameter $n_{ID}^{PUCCH}$ In an example, nRB-CQI may indicate a parameter $n_{ID}^{PUCCH}$. In an example, nRB-CQI may indicate a parameter $N_{RB}^{(2)}$. In an example, numberOfPRB-format4 may indicate a parameter $n_{PUCCH}^{(4)}$ for determining PUCCH resource(s) of PUCCH format 4. In an example, n1PUCCH-AN-InfoList may indicate starting offsets of the PUCCH resource(s) indicated by SIB1-BR. The first entry in the list may be the starting offset of the PUCCH resource(s) of CE level 0, the second entry in the list may be the starting offset of the PUCCH resource(s) of CE level 1, and so on. In an example, if network includes n1PUCCH-AN-InfoList, it may include the same number of entries as in prach-ParametersListCE. In an example, pucch-Format may indicate one of the PUCCH formats for transmission of HARQ-ACK. In an example, for TDD, if the UE is configured with PCell only, the channelSelection may indicates the transmission of HARQ-ACK multiplexing. In an example, pucch-NumRepetitionsCE may indicate number of PUCCH repetitions for PUCCH format 1/1a and for PUCCH format 2/2a/2b for CE modes A and B. In an example, the UE may ignore pucch-NumRepetitionCE-format2-r13, if received, for CE mode B. In an example, for UEs in CE mode B supporting extended PUCCH repetition, if pucch-NumRepetitionCE-format-r14 is signaled then it may override pucch-NumRepetirionCE-format1-r13. In an example, pucch-NumRepetitionCE-Msg4-Level0, pucch-NumRepetitionCE-Msg4-Level1, pucch-NumRepetitionCE-Msg4-Level2, pucch-NumRepetitionCE-Msg4-Level3 may indicate number of repetitions for PUCCH carrying HARQ response to PDSCH containing Msg4 for PRACH CE levels 0, 1, 2 and 3. In an example, value n1 may correspond to 1 repetition, value n2 may correspond to 2 repetitions, and so on. In an example, for BL UEs or non-BL UEs in enhanced coverage suppoting extended PUCCH repetition, if pucch-NumRepetitionCE-Msg4-Level3-r14 is signaled then it may override pucch-NumRepetitionCE-Msg4-Level3-r13. repetitionFactor may indicate a parameter $N_{ANRep}$ where n2 may correspond to repetition factor 2, n4 to 4. In an example, simultaneousPUCCH-PUSCH may indicate whether simultaneous PUCCH and PUSCH transmissions is configured. In an example, network may configure this field for the PCell, when the nonContiguousUL-RA-WithinCC-Info is set to supported in the band on which PCell is configured. In an example, network may configure this field for the PSCell, when the nonContiguousUL-RA-WithinCC-Info is set to supported in the band on which PSCell is configured. In an example, network may configure this field for the PUCCH SCell, when the nonContiguousUL-RA-WithinCC-Info is set to supported in the band on which PUCCH SCell is configured. In an example, spatialBundlingPUCCH may indicate whether spatial bundling is enabled or not for PUCCH. In an example, spatialBundlingPUSCH may indicate whether spatial bundling is enabled or not for PUSCH. In an example, startingPRB-format4 may indicate the parameter $n_{PUCCH}^{(4)}$ for determining PUCCH resource(s) of PUCCH format 4. In an example, startingPRB-format5 may indicate a parameter for determining PUCCH resource(s) of PUCCH format 5. In an example, tdd-AckNackFeedbackMode may indicate one of the TDD ACK/NACK feedback modes. In an example, the value bundling may correspond to use of ACK/NACK bundling. In an example, the value multiplexing may correspond to ACK/NACK multiplexing. The same value may apply to both ACK/NACK feedback modes on PUCCH as well as on PUSCH. In an example, twoAntennaPortActivatedPUCCH-Format1a/1b may indicate whether two antenna ports are configured for PUCCH format 1a/1b for HARQ-ACK. The field may apply for PUCCH format 1a/1b transmission when format3 is configured. In an example, twoAntennaPortActivated-PUCCH-Format3 may indicate whether two antenna ports are configured for PUCCH format 3 for HARQ-ACK.

In an example embodiment, a wireless device may receive one or more messages from a base station. The one or more messages may comprise one or more RRC messages. The one or more messages may comprise configuration parameters for a plurality of cells. The plurality of cells may comprise a primary cell and at least one secondary cell. The one or more messages may comprise configuration parameters for a plurality of physical uplink control channels (PUCCHs). In an example, the plurality of PUCCHs may comprise a plurality of PUCCH formats. In an example, one or more first PUCCH in the plurality of PUCCHs may have a first duration (e.g., short or long) and/or be transmitted using radio resources with a first TTI and one or more second PUCCH in the plurality of PUCCHs may have a second duration (e.g., short or long) and/or be transmitted using radio resources with a second TTI. In an example, the plurality of PUCCHs may comprise a first PUCCH and a second PUCCH. In an example, the first PUCCH may correspond to a first numerology/TTI and the second PUCCH may correspond to a second numerology/TTI. In an example, the first PUCCH may be transmitted using radio resources corresponding to the first numerology/TTI and the second PUCCH may be transmitted using radio resources corresponding to the second TTI/numerology. In an example, the base station may configure a wireless device with one or more cell groups (e.g., PUCCH cell group). In an example, the first PUCCH and the second PUCCH may belong to a same cell group. In an example, the first PUCCH may belong to a first cell group and the second PUCCH may belong to a second cell group. The wireless device may receive a downlink control information (DCI). The DCI may be transmitted using a physical downlink control channel (PDCCH) or an enhanced PDCCH (ePDCCH). The DCI may indicate a downlink assignment for the wireless device. In an example, the DCI may indicate radio resources employed by a base station for transmission of one or more transport blocks (TBs) to the wireless device. In an example, the DCI may comprise other parameters, e.g., for decoding the downlink transmission by the wireless device (e.g., MCS, HARQ related information, e.g., HARQ process ID, etc.). The one or more TBs may be transmitted using a physical downlink shared channel (PDSCH). The wireless device may decode the one or more TBs and may transmit HARQ feedback (e.g., ACK/NACK) to the base station based on the outcome of the decoding of the one or more TBs. In an example, the wireless device may transmit the HARQ feedback using a physical uplink control channel. In an example, the wireless device may transmit the HARQ feedback by multiplexing the HARQ feedback in a physical uplink shared channel (PUSCH). In an example, the DCI indicating the downlink assignment for the wireless device and/or other DCI may indicate a timing between PDSCH and the HARQ feedback. In an example, the DCI indicating the downlink assignment for the wireless device and/or the other DCI may comprise a field, the value of the field indicating the timing between the PDSCH and the HARQ feedback. The wireless device may determine a time between downlink transmission and the HARQ feedback at least based on the timing indicated in the downlink assignment DCI and/or other DCI. The wireless device may determine the timing between downlink transmission and HARQ feedback based on the timing indicated in the DCI and a time granularity for HARQ feedback timing. The time granularity may be in terms of TTI and/or slot duration and/or OFDM symbol duration. In an example, the time between the downlink transmission (e.g., PDSCH) and the HARQ feedback may be determined by multiplying the timing indicated in the DCI by the time granularity for HARQ feedback timing.

In an example, the time granularity for HARQ feedback timing determination may be based on the numerology/TTI of one of the first PUCCH or the second PUCCH. In an example, the time granularity for HARQ feedback timing determination may be based on the numerology/TTI of the PUCCH used for transmission of the HARQ feedback (e.g., one of the first PUCCH or the second PUCCH used for transmission of the HARQ feedback).

Figure 15:
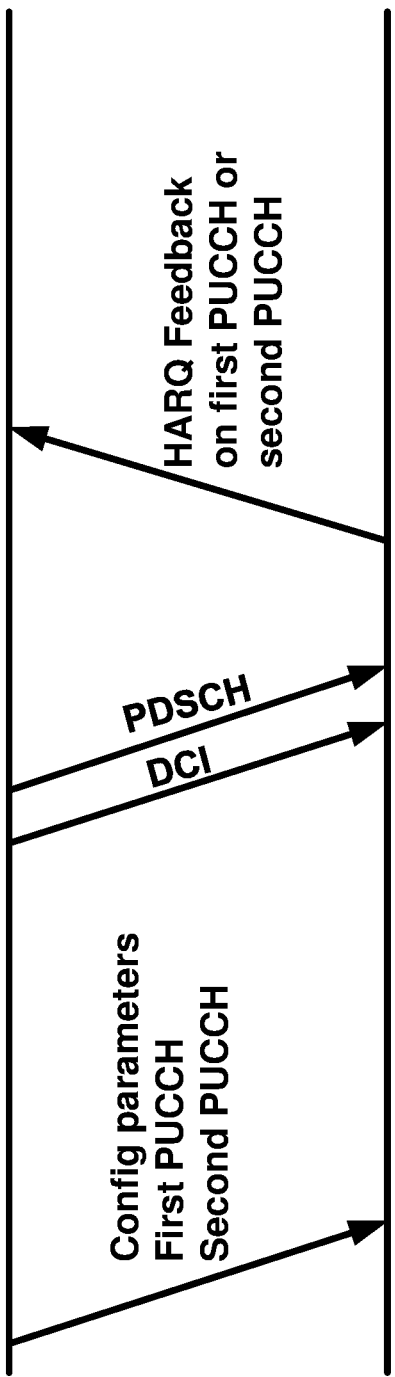
FIG. 15 is an example HARQ feedback procedure as per an aspect of an embodiment of the present invention.

In an example embodiment, the wireless device may transmit the HARQ feedback on one of the first PUCCH or the second PUCCH based on a numerology and/or service type and/or the content (e.g., logical channel(s) and/or MAC CEs and/or alike multiplexed in the one or more TBs of the downlink transmission) and/or size of the one or more TBs of the downlink transmission and/or other criteria. Example HARQ feedback transmission is shown in FIG. 15. In an example, the wireless device may transmit the HARQ feedback on neither of the first PUCCH nor the second PUCCH and/or may transmit/multiplex the HARQ feedback on a PUSCH. In an example, the wireless device may determine that the HARQ feedback may not be transmitted on either of the first PUCCH or the second PUCCH for example, based on the numerology and/or service type and/or the content (e.g., logical channel(s) and/or MAC CEs and/or alike multiplexed in the one or more TBs) and/or size of the one or more TBs of the downlink transmission and/or other criteria.

In an example embodiment, the one or more messages may comprise and/or indicate mapping information between numerology and/or service type and/or the content (e.g., logical channel(s) and/or MAC CEs and/or alike multiplexed in the one or more TBs) and/or size of the one or more TBs of the downlink transmission and/or alike and PUCCH numerology for transmission of HARQ feedback corresponding to the downlink transmission. In an example, the wireless device may transmit the HARQ feedback corresponding to the one or more TBs of the downlink transmission on the first PUCCH or the second PUCCH or may multiplex the HARQ feedback corresponding to the one or more TBs of the downlink transmission on a PUSCH based on mapping information. In an example, the mapping between numerology and/or service type and/or the content (e.g., logical channel(s) and/or MAC CEs and/or alike multiplexed in the one or more TBs) and/or size of the one or more TBs of the downlink transmission and/or alike and PUCCH numerology for transmission of HARQ feedback corresponding to the downlink transmission may be pre-configured for the wireless device. In an example, at least part of mapping information between numerology and/or service type and/or the content (e.g., logical channel(s) and/or MAC CEs and/or alike multiplexed in the one or more TBs) and/or size of the one or more TBs of the downlink transmission and/or alike and PUCCH numerology for transmission of HARQ feedback corresponding to the downlink transmission may be indicated by broadcast system information. In an example, the wireless device may transmit the HARQ feedback corresponding to the one more TBs of the downlink transmission on the first PUCCH or the second PUCCH or may multiplex the HARQ feedback corresponding to the one or more TBs of the downlink transmission on a PUSCH based on mapping information indicated in broadcast system information.

In an example embodiment, a DCI indicating downlink assignment may indicate a numerology/TTI for transmission of HARQ feedback corresponding to the one or more TBs of the downlink transmission. In an example, the DCI may explicitly indicate a numerology/TTI for transmission of the HARQ feedback corresponding to the downlink transmission or the DCI may implicitly indicate the numerology/TTI for transmission of the HARQ feedback. The wireless device may determine the physical channel for HARQ feedback transmission (e.g., first PUCCH or the second PUCCH or a PUSCH) based on the indication in the DCI and/or other criteria/indications. In an example, the one or more messages (e.g. RRC) may configure a plurality of numerologies/TTIs for HARQ feedback and/or other UCI transmission and the DCI may indicate (e.g., using an index) a numerology/TTI in the plurality of numerologies/TTIs. The wireless device may transmit the HARQ feedback on the first PUCCH or the second PUCCH or a PUSCH based on the indication in the DCI and/or RRC configuration parameters.

In an example embodiment, a DCI indicating downlink assignment or an uplink grant may indicate a numerology/TTI for transmission of one or more uplink control information (UCI). In an example, the DCI may explicitly indicate a numerology/TTI for transmission of the one or more UCI or the DCI may implicitly indicate the numerology/TTI for transmission of the one or more UCI. The wireless device may determine the physical channel for transmission of the one or more UCI (e.g., first PUCCH or the second PUCCH or a PUSCH) based on the indication in the DCI and/or other criteria/indications. In an example, the one or more messages (e.g. RRC) may configure a plurality of numerologies/TTIs for transmission of the one more UCI and the DCI may indicate (e.g., using an index) a numerology/TTI in the plurality of numerologies/TTIs. The wireless device may transmit the one or more UCI on the first PUCCH or the second PUCCH or a PUSCH based on the indication in the DCI and/or RRC configuration parameters.

HARQ Feedback Timing

Figure 16:
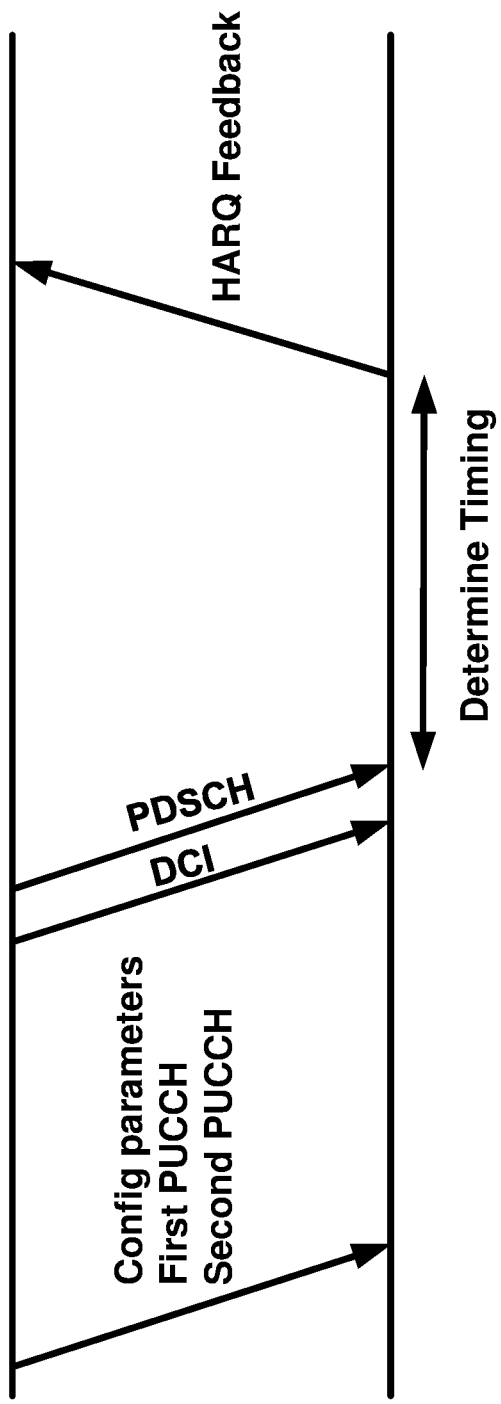
FIG. 16 is an example procedure for determining HARQ feedback timing as per an aspect of an embodiment of the present invention.

Example diagram as per an aspect of an example embodiment showing timing determination between a downlink transmission and a corresponding HARQ feedback is shown in FIG. 16. In an example embodiment, the wireless device may determine a timing (e.g., time granularity for HARQ feedback timing) between the downlink transmission (e.g., transmission of the one or more TBs using the PDSCH) and HARQ feedback corresponding to the downlink transmission (e.g., one or more TBs of the downlink transmission) based on the first numerology/TTI (e.g., the numerology/TTI corresponding to the first PUCCH) or the second numerology/TTI (e.g., the numerology/TTI corresponding to the second PUCCH). In an example, the numerology/TTI used for determining the HARQ feedback timing determination (e.g., HARQ feedback time granularity determination) may be based on the numerology of the physical channel used for transmission of HARQ feedback (e.g., numerology of the PUCCH, e.g., first or second PUCCH, used for transmission of HARQ feedback). The PUCCH and/or physical channel used for transmission of HARQ feedback may be determined based on other embodiments in this disclosure.

In an example embodiment, the numerology/TTI used for determining the HARQ feedback timing corresponding to the one or more TB s of the downlink transmission may be determined based on the numerology/TTI of PCell and/or PSCell and/or the numerology/TTI of the PUCCH on the PCell and/or the PSCell. In an example embodiment, the numerology/TTI used for determining the HARQ feedback timing corresponding to the one or more TBs of the downlink transmission may be determined based on a default numerology/TTI.

In an example embodiment, a DCI indicating downlink assignment may indicate a timing for HARQ feedback. In an example, the DCI may indicate one of the first numerology/TTI or the second TTI/numerology for determining HARQ feedback timing (e.g., time granularity for determining HARQ feedback timing). In an example, the DCI may indicate a TTI/numerology for determining HARQ feedback timing (e.g., time granularity for determining HARQ feedback timing). In an example, the numerology/TTI indicated in the DCI may be the numerology/TTI corresponding to one of the first PUCCH (e.g., the first numerology/TTI) or the second PUCCH (e.g. the second numerology/TTI) or a numerology/TTI different from the first numerology/TTI or the second numerology/TTI. In an example, RRC may configure a plurality of numerologies/TTIs for the wireless device for its HARQ feedback timing determination. A DCI may indicate (e.g., using an index) a numerology/TTI in the plurality of numerologies/TTIs for HARQ feedback timing determination (e.g., HARQ feedback time granularity determination).

In an example embodiment, the wireless device determines a numerology/TTI for HARQ feedback timing determination (e.g., time granularity of HARQ feedback timing) based on the numerology and/or TTI and/or content of the one or more TB s of the downlink transmission (e.g., logical channels and/or MAC CEs multiplexed in the one or more TBs of the downlink transmission) and/or the size of the one or more TBs of the downlink transmission. In an example, the one or more messages (e.g., one or more RRC messages) may indicate a mapping between numerology and/or TTI and/or service type and/or content of the one or more TBs of the downlink transmission (e.g., logical channels and/or MAC CEs multiplexed in the one or more TBs of the downlink transmission) and/or the size of the one or more TBs of the downlink transmission and/or alike and a numerology/TTI for timing determination of HARQ feedback and/or one or more UCI (e.g., time granularity for the HARQ feedback timing determination). In an example embodiment, the mapping between numerology and/or TTI and/or service type and/or content of the one or more TBs of the downlink transmission (e.g., logical channels and/or MAC CEs multiplexed in the one or more TBs of the downlink transmission) and/or the size of the one or more TBs of the downlink transmission and a numerology/TTI for HARQ feedback and/or one or more UCI timing determination (e.g., time granularity for the HARQ feedback timing determination) may be pre-configured for the wireless device. In an example, at least part of the mapping information between numerology and/or TTI and/or service type and/or content of the one or more TBs of the downlink transmission (e.g., logical channels and/or MAC CEs multiplexed in the one or more TBs of the downlink transmission) and/or the size of the one or more TBs of the downlink transmission and a numerology/TTI for HARQ feedback and/or one or more UCI timing determination (e.g., time granularity for the HARQ feedback timing determination) may be indicated by the broadcast system information.

In an example embodiment, the wireless device may determine that HARQ feedback corresponding to one or more TBs of a downlink transmission is multiplexed in a PUSCH. The DCI indicating downlink assignment may indicate a timing for HARQ feedback and the wireless device may determine the time granularity of HARQ feedback timing determination based on numerology/TTI of a PUCCH. In an example, the wireless device may determine the time granularity of HARQ feedback based on the numerology of PUCCH on PCell and/or PSCell. In an example, the wireless device may determine the time granularity of HARQ feedback based on the numerology of the first PUCCH (e.g., the first TTI/numerology) or the numerology of the second PUCCH (e.g. the second TTI/numerology). In an example embodiment, the wireless device may determine the time granularity of HARQ feedback based on the numerology of the downlink transmission (e.g., PDSCH). In an example, the wireless device may determine the time granularity of HARQ feedback based on the numerology of PUSCH that the HARQ feedback is multiplexed.

In an example embodiment, the wireless device may receive a DCI indicating parameters for at least one downlink transmission. A transmission in the at least one downlink transmission may comprise one or more TBs. The parameters may comprise/indicate radio resources for the at least one downlink transmission, MCS, HARQ related parameters, etc. In an example, the DCI may be a dynamic grant indicating downlink assignment for one downlink transmission. In an example, the DCI may activate a plurality of semi-persistent scheduling (SPS) configured grants and/or grant-free resources. The wireless device may employ the parameters indicated in the DCI and/or one or more parameters configured by RRC to decode and/or identify radio resources for the at least one downlink transmission. In an example, one or more cells of the wireless device may correspond to (e.g., for HARQ feedback transmission) to a first PUCCH. In an example, the one or more cells may belong to a cell group. In an example, the one or more cells may be RRC configured. Example embodiments may be employed to determine the correspondence between the one or more cells and the PUCCH. In an example, the wireless device may switch (e.g., for HARQ feedback transmission) from the first PUCCH corresponding to a first numerology/TTI to a second PUCCH corresponding to a second numerology/TTI. In an example, after receiving the DCI and before receiving a first downlink transmission in the at least one downlink transmission, the wireless device may switch from a first PUCCH to a second PUCCH.

In an example embodiment, the one or more messages may configure a plurality of PUCCHs comprising a first PUCCH and a second PUCCH and/or configure a wireless device for PUCCH switching. In an example, the wireless device may indicate, in a capability message to the base station whether the wireless device is capable of PUCCH switching. The base station may configure the wireless device with PUCCH switching if the wireless device is capable of PUCCH switching. In an example, the base station may enable/activate PUCCH switching using a physical layer and/or MAC layer message. The wireless device may receive a message from the base station (e.g., DCI and/or MAC CE) indicating switching from the first PUCCH to the second PUCCH. In an example, the DCI may comprise a field indicating the second PUCCH. In an example, the field may indicate an index that identifies the second PUCCH. The index may identify at least one PUCCH among a plurality of PUCCHs. In an example, the plurality of PUCCHs may be RRC configured. RRC may configure parameters for PUCCH switching. In an example, the DCI may indicate an index to the first PUCCH and an index to the second PUCCH indicating a switching from the first PUCCH to the second PUCCH. In an example, base station may transmit a MAC CE to the wireless device for PUCCH switching. The MAC CE may comprise a field indicating the second PUCCH. In an example, the field may indicate an index that identifies the second PUCCH. The index may identify at least one PUCCH among a plurality of PUCCHs. In an example, the plurality of PUCCHs may be RRC configured. In an example, the MAC CE may indicate an index to the first PUCCH and an index to the second PUCCH indicating a switching from the first PUCCH to the second PUCCH.

In an example embodiment, the switching from the first PUCCH to the second PUCCH may be autonomously performed by the wireless device based on one or more criteria and/or trigger events. In an example, the wireless may switch from the first PUCCH to the second PUCCH in response to the first PUCCH being configured on a secondary cell and the secondary cell being released. In an example, the wireless device may switch from the first PUCCH to the second PUCCH in response to the increased load of UCI transmission on the first PUCCH. The threshold load for PUCCH switching may be RRC configured. In an example, the second PUCCH may be added as an additional PUCCH in response to the increased load of UCI transmission on the first PUCCH. In an example, the wireless may switch from the first PUCCH to the second PUCCH in response to the first PUCCH being configured on a secondary cell and the secondary cell being deactivated (e.g., due to implicit deactivation or explicit deactivation with a deactivation MAC CE).

Figure 17:
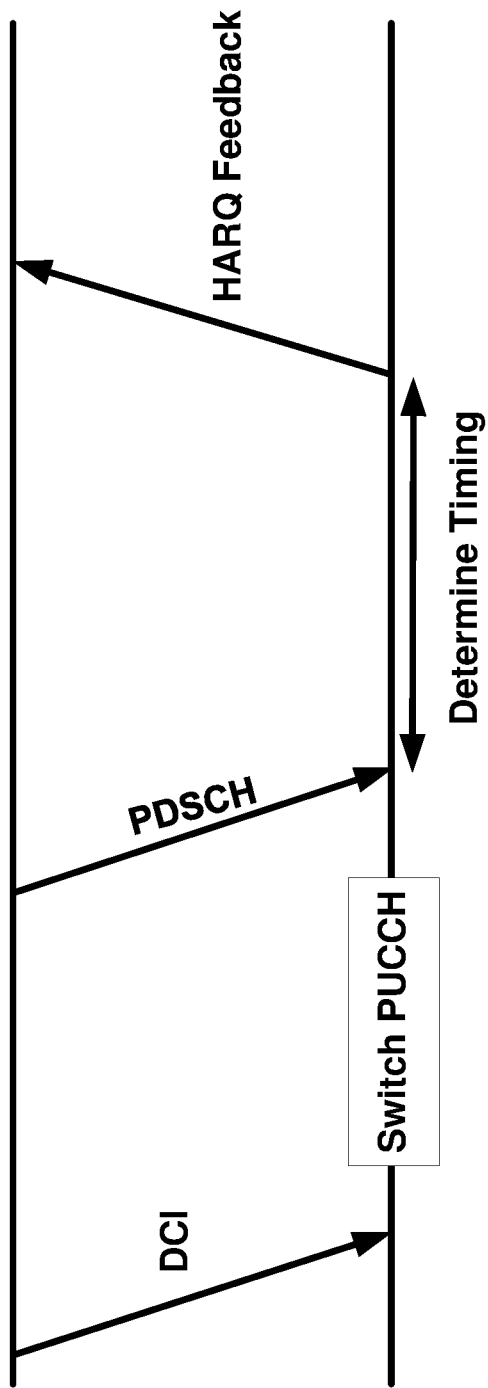
FIG. 17 is an example procedure for determining HARQ feedback timing as per an aspect of an embodiment of the present invention.

An example PUCCH switching and HARQ feedback timing determination as per an aspect of an embodiment is shown in FIG. 17. In an example embodiment, the wireless device may determine a timing between the first downlink transmission and a HARQ feedback for the first downlink transmission based on the first numerology/TTI (e.g., numerology/TTI of the first PUCCH). The first numerology/TTI may be the numerology/TTI for a PUCCH that the wireless device is associated with and/or other physical channel at the time the wireless device receives the DCI. In an example embodiment, the wireless device may determine a timing between the first downlink transmission and a HARQ feedback for the first downlink transmission based on the second numerology/TTI (e.g., numerology/TTI of the second PUCCH). The second numerology/TTI may be the numerology/TTI for a PUCCH that the wireless device is associated with and/or other physical channel at the time the wireless device receives the first downlink transmission.

Figure 18:
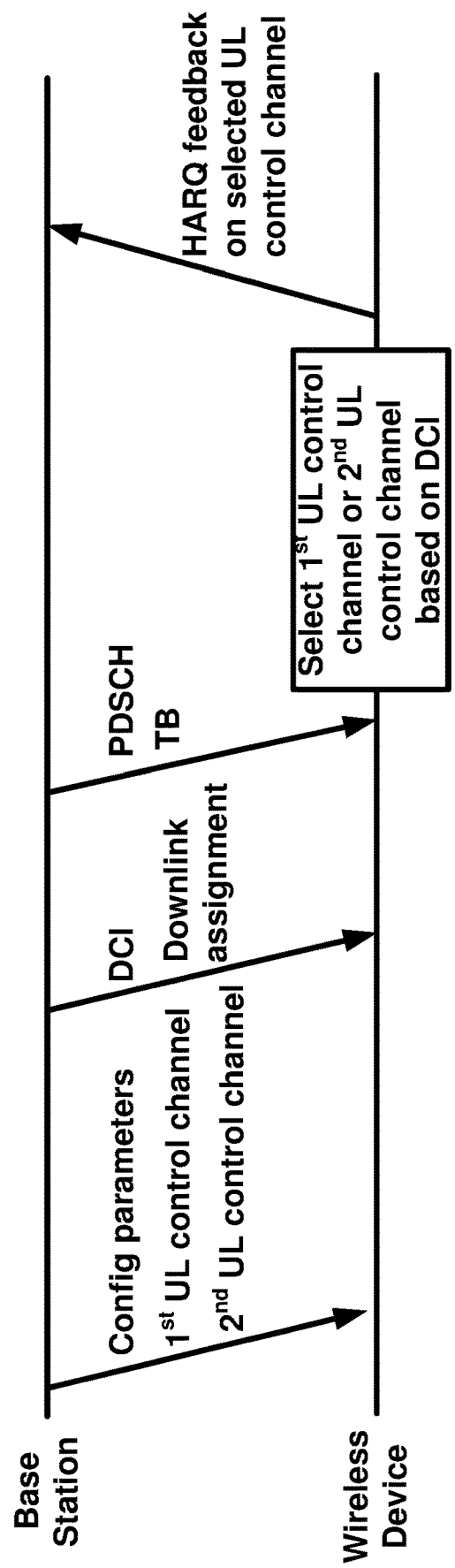
FIG. 18 is an example procedure for UL control channel selection as per an aspect of an embodiment of the present invention.

An example embodiment is shown in FIG. 18. In an example, a wireless device may receive one or more messages comprising configuration parameters. In an example, the one or more messages may be RRC messages. The one or more messages may comprise configuration parameters of a first uplink control channel and a second uplink control channel. In an example, the first uplink control channel may have ae first format and the second uplink control channel may have a second format. In an example, the first uplink control channel may correspond to a first duration and the second uplink control information may correspond to a second duration. In an example the first duration may be one of a plurality of durations (e.g., short, long, etc.) and the second duration may be one of the plurality of the durations (e.g., short, long, etc.). In an example, the first uplink control channel may a first numerology and the second uplink control channel may have a second numerology. In an example, the configuration parameters may indicate first radio resources for the first uplink control channel and the second radio resources of the second uplink control channel. In an example, the one or more messages may comprise first configuration parameters of a first cell group and second configuration parameters of a second cell group. In an example, the first uplink control channel and the second uplink control channel may correspond to the first cell group or the second cell group. In an example, the first uplink control channel may correspond to the first cell group and the second uplink control channel may correspond to the second cell group.

The wireless device may receive a downlink control information indicating a downlink assignment. The downlink control information may indicate a downlink transmission of a transport block via a downlink channel (e.g., PDSCH). In an example, the downlink assignment may indicate radio resources for the downlink transmission of the transport block, HARQ related parameters (e.g., HARQ process ID, NDI, RV, etc.), power control parameter(s), etc. In an example, the downlink control information may comprise a value indicating a timing between the downlink channel (e.g., transmission of the transport block via the downlink channel) and a HARQ feedback corresponding to the transport block. In an example, the downlink control information may activate a configured periodic resource allocation (e.g., semi-persistent scheduling). In an example, the one or more messages may comprise configuration parameters of a periodic resource allocation and the downlink control information may activate the periodic resource allocation. In an example the transport block may be received by the wireless device via a resource of a plurality of resources activated by the downlink control information.

The wireless device may select, as a selected uplink control channel one of the first uplink control channel and the second uplink control channel. In an example, the selecting one of the first uplink control channel and the second uplink control channel may be based on one or more parameters of the downlink control information. In an example, the one or more parameters of the downlink control information may indicate a numerology. In an example, the one or more parameters of the downlink control information may indicate a numerology of the downlink channel. In an example, the one or more parameters of the downlink control information may indicate one or more logical channel, wherein the one or more logical channel are multiplexed in the transport block. In an example, a numerology indicated by the one or more parameters may indicate the one or more logical channels. In an example, the one or more parameters of the downlink control information may indicate a size of the transport block.

The wireless device may transmit a HARQ feedback for the transport block (e.g., ACK/NACK) via the selected uplink control channel. In an example, the HARQ feedback may be transmitted via the selected uplink control channel in a first slot. In an example, the first slot may be determined based on the value and a numerology of the selected uplink control channel. In an example, the value may indicate a timing between the downlink channel (e.g., transmission of the transport block via the downlink channel) and a HARQ feedback corresponding to the transport block.

Figure 19:
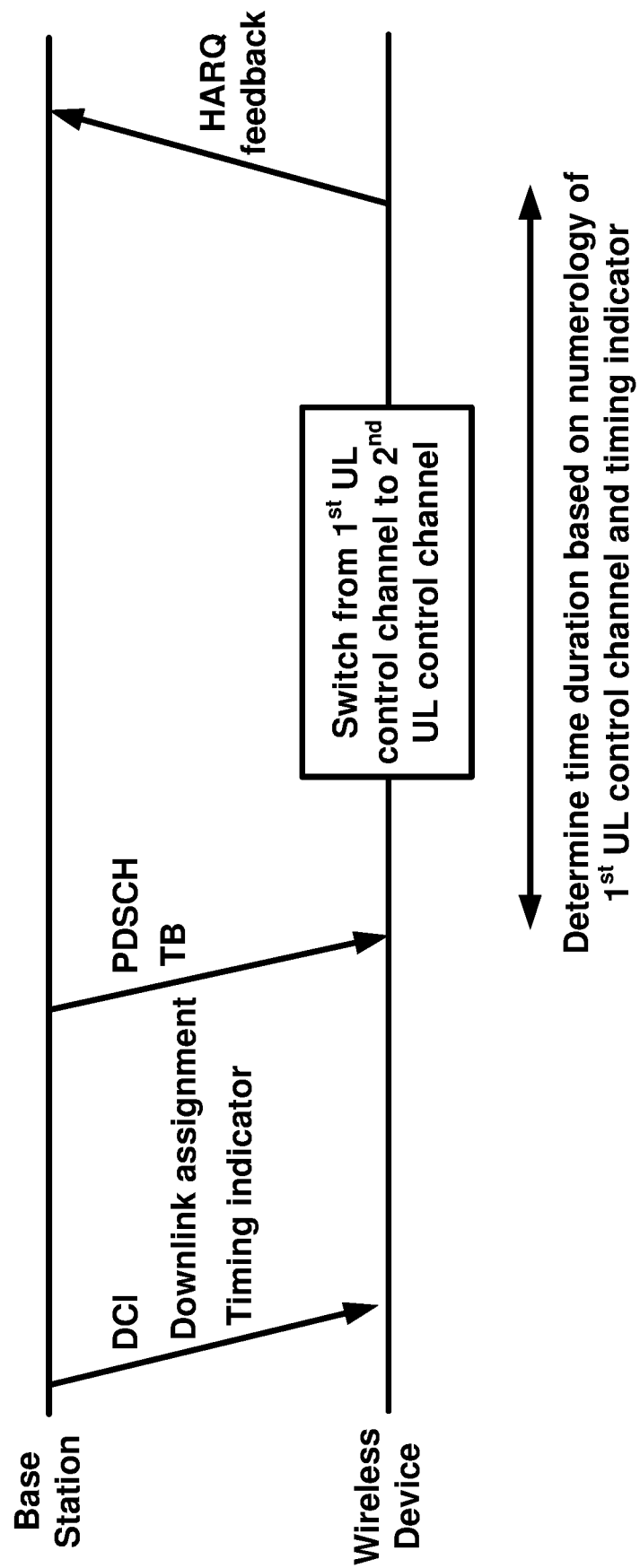
FIG. 19 is an example procedure for determining HARQ feedback timing as per an aspect of an embodiment of the present invention.

An example embodiment is shown in FIG. 19. In an example, a wireless device may receive one or more messages comprising configuration parameters. In an example, the one or more messages may be RRC messages. The one or more messages may comprise configuration parameters of a first uplink control channel and a second uplink control channel. In an example, the first uplink control channel may have ae first format and the second uplink control channel may have a second format. In an example, the first uplink control channel may correspond to a first duration and the second uplink control information may correspond to a second duration. In an example the first duration may be one of a plurality of durations (e.g., short, long, etc.) and the second duration may be one of the plurality of durations (e.g., short, long, etc.). In an example, the first uplink control channel may a first numerology and the second uplink control channel may have a second numerology. In an example, the first numerology may indicate a first slot duration and the second numerology may indicate a second slot duration. In an example, the configuration parameters may indicate first radio resources for the first uplink control channel and the second radio resources of the second uplink control channel. In an example, the one or more messages may comprise first configuration parameters of a first cell group and second configuration parameters of a second cell group. In an example, the first uplink control channel and the second uplink control channel may correspond to the first cell group or the second cell group. In an example, the first uplink control channel may correspond to the first cell group and the second uplink control channel may correspond to the second cell group.

In an example, the wireless device may receive a downlink control information comprising first parameters indicating downlink transmission of a transport block. The first parameters may indicate radio resources for the downlink transmission of the transport block, HARQ related parameters (e.g., HARQ process ID, NDI, RV, etc.), power control parameter(s), etc. The downlink control information may comprise a second parameter indicating a timing between the transport block and a feedback corresponding to the transport block. In an example, the feedback may be a HARQ feedback. In an example, the downlink control information may be received in a first slot. In an example, the transport block may correspond to the first uplink control channel when the downlink control information (e.g., in the first slot). In an example, the transport block may be received via a first cell. A first cell group, comprising the first cell, may correspond to the first uplink control channel.

In an example, after receiving the downlink control information, the wireless device may switch from the first uplink control channel with the first numerology to the second uplink control channel with the second numerology. In an example, the switching may be performed by the wireless device based on one or more criteria. In an example, the switching may be based on a switching command from the base station. In an example, the switching command may be received via a second downlink control information. In an example, the switching command for switching uplink control channel may be a control element. In an example, the control element indicating the switching the uplink control may be received with a first transport block. In an example, the first transport block may be the transport block. In an example, the switching command may comprise an identifier for the second uplink control channel. In an example, the switching may be based on a load of uplink control information on the first uplink control channel. In an example, if the load of uplink control information is above a threshold (e.g., an RRC configured threshold) the wireless device may switch from the first uplink control channel to the second uplink control channel. In an example, the wireless device may transmit one or more capability messages indicating that the wireless device is capable of switching uplink control channel. The wireless device may receive the switching command from the base station in response to the one or more capability messages indicating that the wireless device is capable of switching uplink control channel. In an example, the transport block may comprise one or more logical channels and the first uplink control channel or the second uplink control channel may be based on the first uplink control channel or the second uplink control channel.

In an example, the wireless device may determine a time duration between the transport block and the feedback (e.g., HARQ feedback) based on the second parameter indicated by the downlink control information (e.g., the second parameter indicating a timing between the transport block (e.g., downlink channel wherein the transport block is transmitted) and a feedback corresponding to the transport block) and the first numerology of the first uplink control channel. In an example, the wireless device may transmit the feedback via the second uplink control channel based on the determined time duration.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 20:
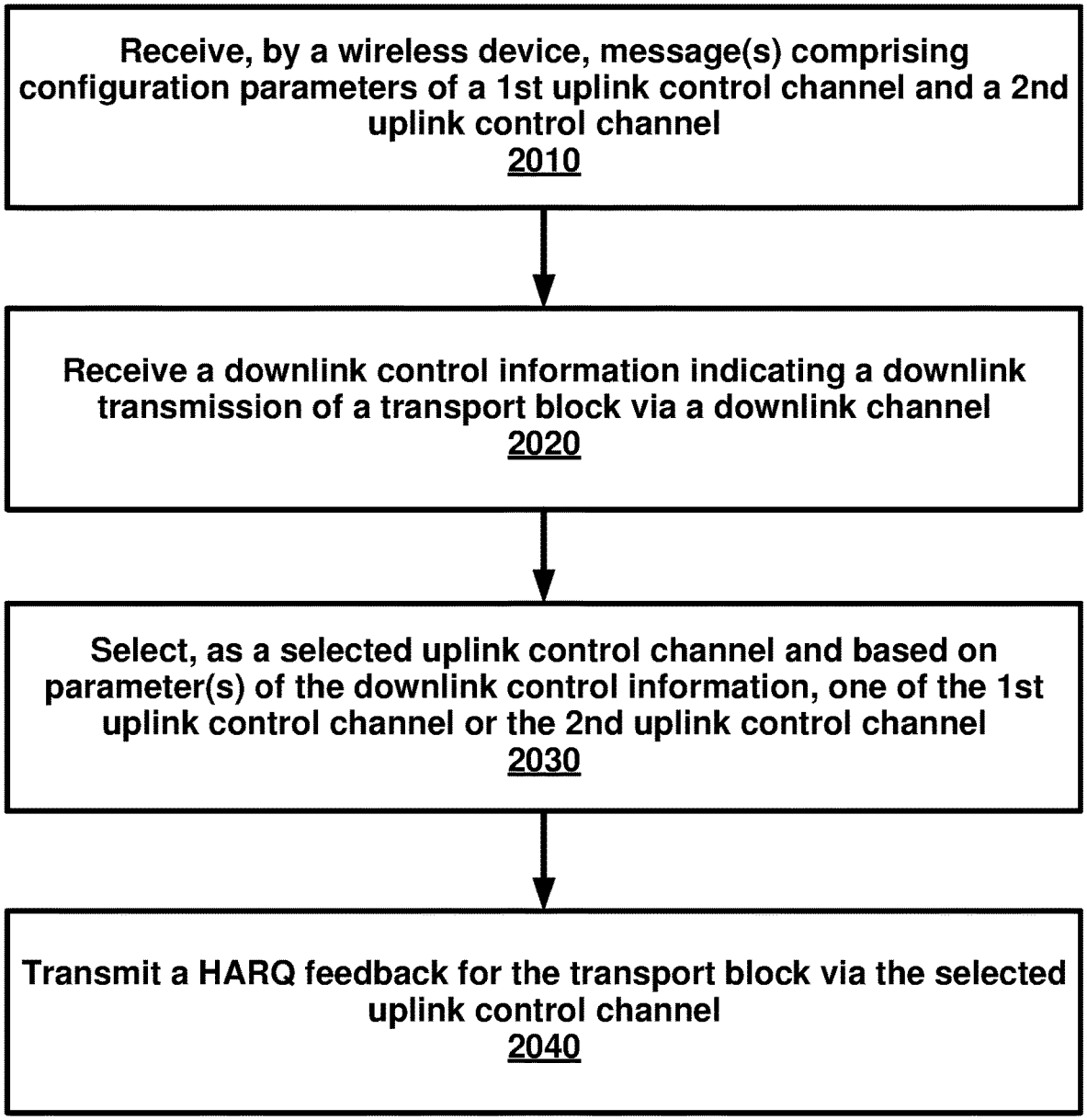
FIG. 20 is a flow diagram of an aspect of an embodiment of the present disclosure.

FIG. 20 is an example flow diagram as per an aspect of an embodiment of the present disclosure. At 2010, a wireless device may receive one or more messages. The one or more messages may comprise configuration parameters of a first uplink control channel and a second uplink control channel. At 2020, downlink control information may be received. The downlink control information may indicate a downlink transmission of a transport block via a downlink channel. At 2030, one of the first uplink control channel or the second uplink control channel may be selected as a selected uplink control channel based on one or more parameters of the downlink control information. At 2040, a hybrid automatic repeat request (HARQ) feedback for the transport block may be transmitted via the selected uplink control channel.

According to an example embodiment, the one or more parameters of the downlink control information may indicate a numerology of the downlink channel. According to an example embodiment, the first uplink control channel may have a first format. According to an example embodiment, the second uplink control channel may have a second format. According to an example embodiment, the first uplink control channel may correspond to a first duration. According to an example embodiment, the second uplink control channel may correspond to a second duration. According to an example embodiment, the configuration parameters may indicate first radio resources for the first uplink control channel. According to an example embodiment, the configuration parameters may indicate second radio resources for the second uplink control channel.

According to an example embodiment, the one or more parameters of the downlink control information may indicate one or more logical channels. Data of the one or more logical channels may be multiplexed in the transport block. According to an example embodiment, the one or more messages may comprise first configuration parameters of a first cell group and a second cell group. According to an example embodiment, the first uplink control channel and the second uplink control channel may correspond to the first cell group or the second cell group. According to an example embodiment, the first uplink control channel may correspond to the first cell group. According to an example embodiment, the second uplink control channel may correspond to the second cell group. According to an example embodiment, the downlink control information may comprise a value indicating a timing between the downlink channel and the HARQ feedback. According to an example embodiment, the HARQ feedback may be transmitted via the selected uplink control channel in a first slot. According to an example embodiment, the first slot may be based on the value and a numerology of the selected uplink control channel.

According to an example embodiment, the one or more parameters of the downlink control information may indicate a size of the transport block. According to an example embodiment, the first uplink control channel may correspond to a first duration. According to an example embodiment, the second uplink control channel may correspond to a second duration. According to an example embodiment, the configuration parameters may indicate first radio resources for the first uplink control channel. According to an example embodiment, the configuration parameters may indicate second radio resources for the second uplink control channel.

According to an example embodiment, the first uplink control channel may have a first format. According to an example embodiment, the second uplink control channel may have a second format. According to an example embodiment, the first uplink control channel may correspond to a first duration. According to an example embodiment, the second uplink control channel may correspond to a second duration. According to an example embodiment, the configuration parameters may indicate first radio resources for the first uplink control channel. According to an example embodiment, the configuration parameters may indicate second radio resources for the second uplink control channel. According to an example embodiment, the one or more messages may comprise first configuration parameters of a first cell group and a second cell group. According to an example embodiment, the first uplink control channel and the second uplink control channel may correspond to the first cell group or the second cell group. According to an example embodiment, the first uplink control channel may correspond to the first cell group. According to an example embodiment, the second uplink control channel may correspond to the second cell group. According to an example embodiment, the downlink control information may comprise a value indicating a timing between the downlink channel and the HARQ feedback. According to an example embodiment, the HARQ feedback may be transmitted via the selected uplink control channel in a first slot. According to an example embodiment, the first slot may be based on the value and a numerology of the selected uplink control channel.

Figure 21:
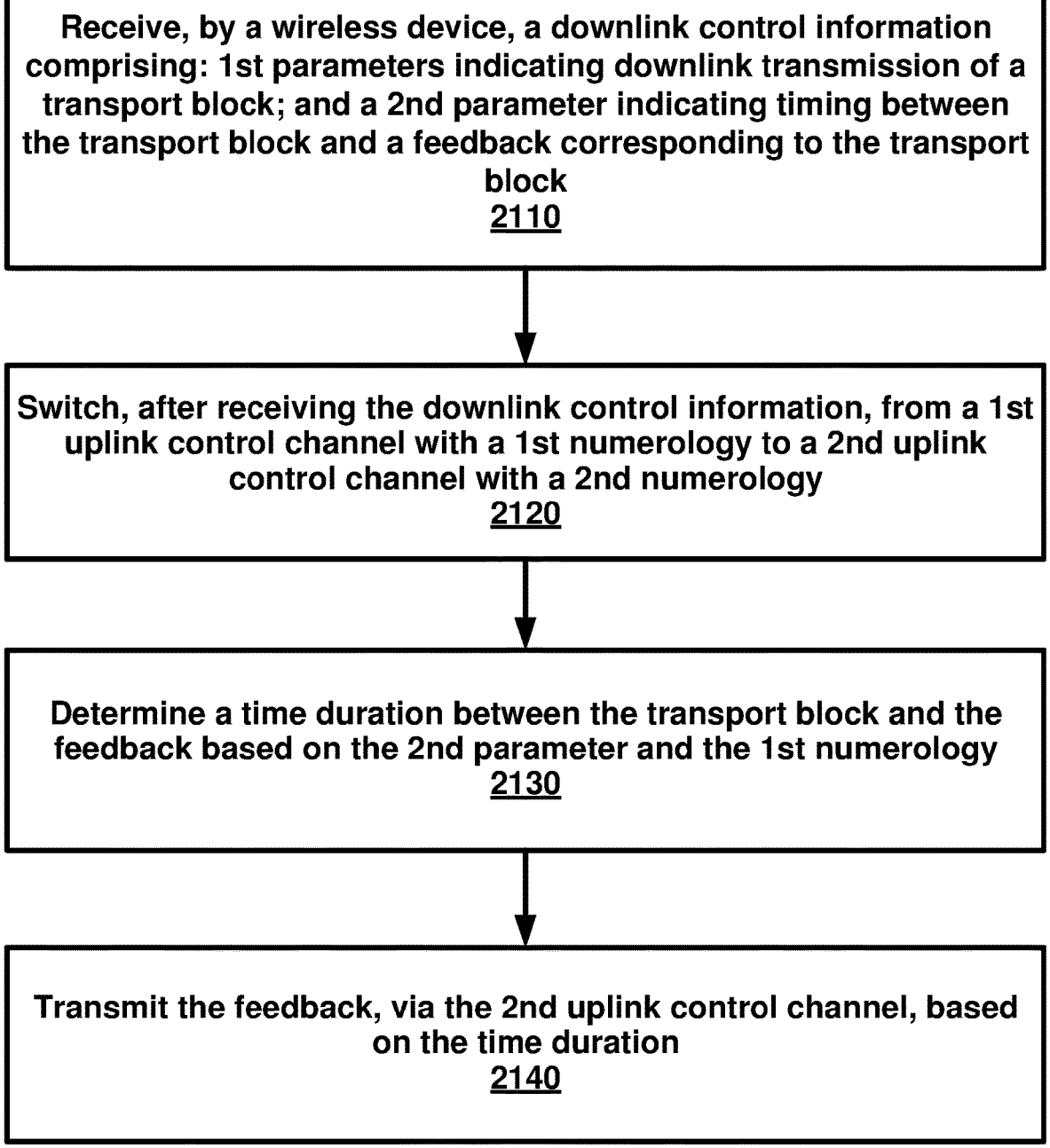
FIG. 21 is a flow diagram of an aspect of an embodiment of the present disclosure.

FIG. 21 is an example flow diagram as per an aspect of an embodiment of the present disclosure. At 2110, a wireless device may receive downlink control information. The downlink control information may comprise first parameters indicating downlink transmission of a transport block. The downlink control information may comprise a second parameter indicating timing between the transport block and a feedback corresponding to the transport block. At 2120, after receiving the downlink control information, the wireless device may switch from a first uplink control channel with a first numerology to a second uplink control channel with a second numerology. At 2130, a time duration between the transport block and the feedback may be determined based on the second parameter and the first numerology. At 2140, the feedback may be transmitted via the second uplink control channel based on the time duration.

According to an example embodiment, the switching may be in response to receiving a command indicating the switching. According to an example embodiment, the command may be transmitted via a second downlink control information. According to an example embodiment, the transport block may be received via a first cell. According to an example embodiment, a first cell group, comprising the first cell, may correspond to the first uplink control channel. According to an example embodiment, the first numerology may indicate a first slot duration. According to an example embodiment, the second numerology may indicate a second slot duration. According to an example embodiment, the feedback may be a hybrid automatic repeat request feedback. According to an example embodiment, the command may be a control element. According to an example embodiment, the transport block may be received via a first cell. According to an example embodiment, a first cell group, comprising the first cell, may correspond to the first uplink control channel. According to an example embodiment, the first numerology may indicate a first slot duration. According to an example embodiment, the second numerology may indicate a second slot duration. According to an example embodiment, the command may comprise an identifier of the second uplink control channel. According to an example embodiment, the transport block may be received via a first cell. According to an example embodiment, a first cell group, comprising the first cell, may corresponds to the first uplink control channel. According to an example embodiment, the first numerology may indicate a first slot duration. According to an example embodiment, the second numerology may indicate a second slot duration. According to an example embodiment, the feedback may be a hybrid automatic repeat request feedback. According to an example embodiment, the transport block may be received via a first cell. According to an example embodiment, a first cell group, comprising the first cell, may correspond to the first uplink control channel. According to an example embodiment, the switching may be based on a load of uplink control information on the first uplink control channel. According to an example embodiment, the switching may be in response to the load of the uplink control information on the first uplink control channel being above a threshold.

According to an example embodiment, the first numerology may indicate a first slot duration. According to an example embodiment, the second numerology may indicate a second slot duration. According to an example embodiment, the feedback may be a hybrid automatic repeat request feedback. According to an example embodiment, the wireless device may transmit one or more capability messages to a base station. The one or more capability messages may indicate that the wireless device is capable of switching uplink control channel. According to an example embodiment, the transport block may comprise data from one or more logical channels. According to an example embodiment, the first uplink control channel or the second uplink control channel may be based on the one or more logical channels.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   transmitting, by a wireless device and to a base station, a capability message indicating a physical uplink control channel (PUCCH) switching capability of the wireless device;
   receiving, based on the PUCCH switching capability, one or more messages comprising configuration parameters of a first PUCCH and a second PUCCH of a cell group;
   receiving downlink control information (DCI) indicating a downlink transmission of a transport block;
   selecting, a field of the DCI, a PUCCH from the first PUCCH and the second PUCCH of the same cell group; and
   transmitting a hybrid automatic repeat request (HARQ) feedback for the transport block via the selected PUCCH.

2. The method of claim 1, wherein:
   the DCI is received via a downlink channel; and
   one or more parameters of the DCI indicate a numerology of a carrier of the downlink channel.

3. The method of claim 2, wherein the first PUCCH has a first format and the second PUCCH has a second format.

4. The method of claim 2, wherein the first PUCCH corresponds to a first duration and the second PUCCH corresponds to a second duration.

5. The method of claim 2, wherein the configuration parameters indicate first radio resources for the first PUCCH and second radio resources for the second PUCCH.

6. The method of claim 1, wherein one or more parameters of the DCI indicate one or more logical channels, wherein data of the one or more logical channels are multiplexed in the transport block.

7. The method of claim 6, wherein:
   the DCI is received via a downlink channel;
   the DCI comprises a value indicating a timing between the downlink channel and the HARQ feedback;
   the HARQ feedback is transmitted via the selected PUCCH in a first slot; and
   the first slot is based on the value and a numerology of the selected PUCCH.

8. The method of claim 1, wherein one or more parameters of the DCI indicate a size of the transport block.

9. The method of claim 8, wherein the first PUCCH corresponds to a first duration and the second PUCCH corresponds to a second duration.

10. The method of claim 8, wherein the configuration parameters indicate first radio resources for the first PUCCH and second radio resources for the second PUCCH.

11. The method of claim 1, wherein the first PUCCH has a first format and the second PUCCH has a second format.

12. The method of claim 1, wherein the first PUCCH corresponds to a first duration and the second PUCCH corresponds to a second duration.

13. The method of claim 1, wherein the configuration parameters indicate first radio resources for the first PUCCH and second radio resources for the second PUCCH.

14. The method of claim 1, wherein:
   the DCI is received via a downlink channel;
   the DCI comprises a value indicating a timing between the downlink channel and the HARQ feedback;
   the HARQ feedback is transmitted via the selected PUCCH in a first slot; and
   the first slot is based on the value and a numerology of the selected PUCCH.

15. The method of claim 1, wherein:
   a first cell, of the cell group, is configured with the first PUCCH; and
   a second cell, of the cell group, is configured with the second PUCCH.

16. The method of claim 1, wherein the cell group is a PUCCH group.

17. The method of claim 16, wherein:
   a first cell, of the PUCCH group, is configured with the first PUCCH; and
   a second cell, of the PUCCH group, is configured with the second PUCCH.

* * * * *

UNITED STATES PATENT AND TRADEMARK OFFICE
CERTIFICATE OF CORRECTION

| | |
|---|---|
| PATENT NO. | : 11,316,619 B2 |
| APPLICATION NO. | : 16/122212 |
| DATED | : April 26, 2022 |
| INVENTOR(S) | : Alireza Babaei et al. |

It is certified that error appears in the above-identified patent and that said Letters Patent is hereby corrected as shown below:

In the Claims

In Column 43, Line 35, replace "selecting, a field of the DCI, a PUCCH from the first" with --selecting, based on a field of the DCI, a PUCCH from the first--.

Signed and Sealed this
Twenty-eighth Day of June, 2022

Katherine Kelly Vidal
*Director of the United States Patent and Trademark Office*